US007058936B2

(12) United States Patent
Chilimbi et al.

(10) Patent No.: US 7,058,936 B2
(45) Date of Patent: Jun. 6, 2006

(54) DYNAMIC PREFETCHING OF HOT DATA STREAMS

(75) Inventors: Trishul Chilimbi, Seattle, WA (US); Martin Hirzel, Boulder, CO (US)

(73) Assignee: Microsoft Corporation, Redmond, WA (US)

( * ) Notice: Subject to any disclaimer, the term of this patent is extended or adjusted under 35 U.S.C. 154(b) by 606 days.

(21) Appl. No.: 10/304,306

(22) Filed: Nov. 25, 2002

(65) Prior Publication Data

US 2004/0103408 A1 May 27, 2004

(51) Int. Cl.
*G06F 9/45* (2006.01)
*G06F 9/44* (2006.01)

(52) U.S. Cl. ........................ 717/158; 717/130

(58) Field of Classification Search ................ 717/130, 717/131, 154, 158
See application file for complete search history.

(56) References Cited

U.S. PATENT DOCUMENTS

| | | | | |
|---|---|---|---|---|
| 5,774,685 | A * | 6/1998 | Dubey | 712/205 |
| 5,925,100 | A * | 7/1999 | Drewry et al. | 709/219 |
| 5,940,618 | A | 8/1999 | Blandy et al. | |
| 5,953,524 | A * | 9/1999 | Meng et al. | 717/108 |
| 6,311,260 | B1 * | 10/2001 | Stone et al. | 712/207 |
| 6,321,240 | B1 | 11/2001 | Chilimbi et al. | |
| 6,330,556 | B1 | 12/2001 | Chilimbi et al. | |
| 6,360,361 | B1 | 3/2002 | Larus et al. | |
| 6,560,693 | B1 * | 5/2003 | Puzak et al. | 712/207 |
| 6,571,318 | B1 * | 5/2003 | Sander et al. | 711/137 |
| 6,675,374 | B1 * | 1/2004 | Pieper et al. | 717/141 |
| 6,704,860 | B1 * | 3/2004 | Moore | 712/237 |
| 6,848,029 | B1 * | 1/2005 | Coldewey | 712/207 |
| 6,951,015 | B1 * | 9/2005 | Thompson | 717/158 |
| 2002/0144245 | A1 | 10/2002 | Lueh | |
| 2004/0025145 | A1 | 2/2004 | Dawson | |
| 2004/0103401 | A1 | 5/2004 | Chilimbi et al. | |
| 2004/0215880 | A1 | 10/2004 | Chilimbi et al. | |
| 2005/0091645 | A1 | 4/2005 | Chilimbi et al. | |

OTHER PUBLICATIONS

Arnold et al., *A Framework for Reducing the Cost of Instrumented Code*, Rutgers University Technical Report DCS-TR-424 (Nov. 2000).

Karlsson et al., *A Prefetching Technique for Irregular Accesses to Linked Data Structures*, Sixth International Symposium on High-Performance Computer Architecture (Jan. 2000).

Cooksey et al., *A Stateless, Content-Directed Data Prefetching Mechanism*, ACM (2002).

(Continued)

*Primary Examiner*—Kakali Chaki
*Assistant Examiner*—William H. Wood
(74) *Attorney, Agent, or Firm*—Klarquist Sparkman LLP

(57) ABSTRACT

A method and system for creating and injecting code into a running program that identifies a hot data stream, and prefetching data elements in the stream so they are available when needed by the processor. The injected code identifies the first few elements in a hot data stream (i.e. the prefix), and prefetches the balance of the elements in the stream (i.e., the suffix). Since the hot data stream identification code and prefetch code is injected at run time, pointer related time-dependencies inherent in earlier prefetch systems are eliminated. A global deterministic finite state machine (DFSM) is used to help create conceptual logic used to generate the code injected into the program for prefix detection.

20 Claims, 12 Drawing Sheets

OTHER PUBLICATIONS

Klaiber et al., *An Architecture for Software-Controlled Data Prefetching*, ACM (1991).
Rubin et al., *An Efficient Profile-Analysis Framework for Data-Layout Optimizations*, POPL (Jan. 2002).
Hirzel et al., *Bursty Tracing: A Framework for Low-Overhead Temporal Profiling*, 4th ACM Workshop on Feedback-Directed and Dynamic Optimization (Dec. 2001).
Luk et al., *Compiler-Based Prefetching for Recursive Data Structures*, ACM (1996).
Anderson et al., *Continuous Profiling: Where Have All the Cycles Gone? ACM* (Nov. 1997).
Cahoon et al., *Data Flow Analysis for Software Prefetching Linked Data Structures in Java*, IEEE (2001).
Vanderwiel et al., *Data Prefetch Mechanisms*, ACM Computing Surveys, vol. 32, No. 2 (Jun. 2000).
Annavaram et al., *Data Prefetching by Dependence Graph Precomputation*, IEEE (2001).
Mowry et al., *Design and Evaluation of a Compiler Algorithm for Prefetching*, ACM (1992).
Chilimbi et al., *Dynamic Hot Data Stream Prefetching for General-Purpose Programs*, ACM, (2002).
Bala et al., *Dynamo: A Transparent Dynamic Optimization System*, ACM (2000).
Roth et al., *Effective Jump-Pointer Prefetching for Linked Data Structures*, IEEE (1999).
Ball et al., *Efficient Path Profiling*, IEEE (1996).
Chilimbi, *Efficient Representations and Abstractions for Quantifying and Exploiting Data Reference Locality*, ACMI (2001).
Jouppi, *Improving Direct-Mapped Cache Performance by the Addition of a Small Fully-Associative Cache and Prefetch Buffers*, IEEE (1990).
Saavedra et al., *Improving the Effectiveness of Software Prefetching With Adaptive Execution*, IEEE (1996).
Chilimbi et al., *On the Stability of Temporal Data Reference Profiles*, PACT (Sep. 2001).
Joseph et al., *Prefetching Using Markov Predictors*, ACM (1997).
Chen et al., *Reducing Memory Latency via Non-Blocking and Prefetching Caches*, ACM (1992).
Stoutchinin et al., *Speculative Prefetching of Induction Pointers*, Proceedings of 10th International Conference on Compiler Construction (2001).
Srivastava et al., *Vulcan Binary Transformation in a Distributed Environment*, Microsoft Research, MSR-TR-99-76 (Apr. 20, 2001).
Deaver et al., *Wiggins/Redstone: An On-line Program Specializer*, Proceedings of the IEEE Hot Chips XI Conference (Aug. 1999).
U.S. Appl. No. 11/134,812, filed May 20, 2005, Ganapathy et al.
U.S. Appl. No. 11/134,796, filed May 20, 2005, Shankar et al.
U.S. Appl. No. 11/115,924, filed Apr. 26, 2005, Chilimbi et al.
Ammons et al., "Exploiting Hardware Performance Counters with Flow and Context Sensitive Profiling", PLDI (Jun. 1997), 12 pages.
Ammons et al., "Improving Data-Flow Analysis with Path Profiles," *SIGPLAN '98* (1998), pp. 72-84.
Balakrishnan et al., "Analyzing Memory Accesses in $\chi86$ Binary Executables", *Proc. 13th Intl. Conference on Compiler Construction*, LNCS 2985 (Apr. 2004), pp. 5-23.

Berger et al., "Composing High-Performance Memory Allocators", ACM (2001), 11 pages.
Bush et al., "A Static Analyzer for Finding Dynamic Programming Errors", *Software: Practice and Experience* (2000), pp. 775-802.
Calder et al., "Cache-Conscious Data Placement", ACM (1998), 11 pages.
Chilimbi et al., "Cache-Conscious Structure Definition", *Proceedings of the ACM SIGPLAN '99* (May 1999), 12 pages.
Chilimbi et al., "Cache-Conscious Structure Layout", *Proc. ACM SIGPLAN '99 Conf. on Programming Language Design and Impl.*, (May 1999), 12 pages.
Chilimbi et al., "Low-Overhead Memory Leak Detection Using Adaptive Statistical Profiling", *Proc. 11th Intl. Conference on Architectural Support for Programming Language and Operating Systems (ASPLOS)*, (Oct. 2004), pp. 156-164.
Chilimbi et al., "Using Generational Garbage Collection to Implement Cache-Conscious Data Placement", *Proceedings of the First International Symposium on Memory Management* (Oct. 1998), vol. 34(3), pp. 37-48.
Cowan et al., "Buffer Overflows: Attacks and Defenses for the Vulnerability of the Decade", *DARPA information survivability conference and expo (DISCEX)* (2000), pp. 1-11.
Crescenzi at al., "A Compendium of NP Optimization Problems," [Downloaded from the World Wide Web on Dec. 12, 2003], 20 pages.
Dean et al., "*ProfileMe*: Hardware Support for Instruction-Level Profiling on Out-of-Order Processors", *Proc. 30th Annual Intl. Symp. On Microarchitecture* (Dec. 1997), 12 pages.
Demsky et al., "Automatic Detection and Repair of Errors in Data Structures", *Proceedings of 18th ACM SIGPLAN Conference on Object-Oriented Programming Systems, Language and Applications (OOPLSA)* (Oct. 2003), pp. 78-95.
Demsky et al., "Role-Based Exploration of Object-Oriented Programs", *Proceedings of 24th International Conference on Software Engineering (ISCE)* (May 2002), pp. 313-334.
Dor et al., "Cleanness Checking of String Manipulations in C Programs via Integer Analysis", *Proc. 8th Int'l Static Analysis Symposium* (Jun. 2001), 19 pages.
Dor et al., "CSSV: Towards a Realistic Tool for Statically Detecting All Buffer Overflows in C", *PLDI '03* (Jun. 9-11, 2003), pp. 155-167.
Duesterwald et al., "Software profiling for hot path prediction: Less is more," *Ninth International Conference on Architectural Support for Programming Languages and Operating Systems* (Nov. 2000), pp. 202-211.
Edwards, "Black-Box Testing Using Flowgraphs: An Experimental Assessment of Effectiveness and Automation Potential", *Software Testing, Verification and Reliability*, vol. 10, No. 4 (Dec. 2000), pp. 249-262.
Eeckhout et al., "Workload Design: Selecting Representative Program-Input Pairs", *Proceedings of the 2002 International Conference on Parallel Architectures and Compilation Techniques* (2002), 12 pages.
Ernst, "Dynamically Discovering Likely Program Invariants", *PhD Thesis, University of Washington* (Aug. 2000), pp. 1-127.
Evans et al., "Improving Security Using Extensible Lightweight Static Analysis", *IEEE Software* (Jan./Feb. 2002), pp. 42-51.

Evans et al., "LCLint: A Tool for Using Specifications to Check Code", *SIGSOFT Symposium on the Foundations of Software Engineering* (Dec. 1994), 10 pages.

Evans et al., "Splint Manual, Version 3.1.1-1", *Secure Programming Group, University of Virginia Department of Computer Science* (Jun. 5, 2003), 121 pages.

Evans, "Static Detection of Dynamic Memory Errors", *SIGPLAN Conf. on Programming Language and Design Implementation* (May 1996), 10 pages.

Evans, "Using Specifications to Check Source Code", *TR-628, MIT Lab for Computer Science* (Jun. 1994), 97 pages.

Foster et al., "A Theory of Type Qualifiers", *Proc. ACM SIGPLAN '99 Conf. on Programming Language and Design Implementation (PLDI)* (May 1999), 12 pages.

Gloy et al., "Procedure Placement Using Temporal-Ordering Information", *ACM Transactions on Programming Languages and System*, vol. 21 (1999), pp. 111-161.

Guyer et al., "An Annotation Language for Optimizing Software Libraries", *Proc. Second Conf. on Domain Specific Languages* (Oct. 1999), 14 pages.

Halldorsson, "Approximations of Weighted Independent Set and Hereditary Subset Problems", *JGAA*, vol. 4, No. 1 (Apr. 2000), pp. 1-16.

Hangal et al., "Tracking Down Software Bugs Using Automatic Anomaly Detection", *Proceedings of 22nd International Conference on Software Engineering (ICSE)* (Jan. 1992), pp. 125-136.

Harris, "Dynamic Adaptive Pre-tenuring", *Proceedings of the International Symposium on Memory Management* (Oct. 2000), 9 pages.

Hastings et al., "Purify: Fast Detection of Memory Leaks and Access Errors", *Proceedings of the Winter 1992 USENIX Conference* (1992), 10 pages.

Heil et al., "Relational Profiling: Enabling Thread-Level Parallelism in Virtual Machines", *Proc. 33rd International Symposium on Microarchitecture* (Dec. 2000), pp. 1-10.

Hirzel et al., "Understanding the Connectivity of Heap Objects", *Proceedings of International Symposium on Memory Management (ISMM)* (Jun. 2002), pp. 143-156.

Hollingsworth et al., "MDL: A Language and Compiler for Dynamic Program Instrumentation", *Proc. Of the International Conference on Parallel Architectures and Compilations Techniques* (Nov. 1997), 12 pages.

Hölzle et al., "Reconciling Responsiveness with Performance in Purse Object-Oriented Languages", *ACM Transactions on Programming Languages and Systems* (Jul. 1996), pp. 1-40.

Horning, "The Larch Shared Language: Some Open Problems", *Compass/ADT Workshop* (Sep. 1995), 16 pages.

"JProfiler Manual," ejtechnologies, GmbH (2004), pp. 1-141.

Khurshid et al., "An Analyzable Annotation Language," *OOPSLA '02* (Nov. 2002), 15 pages.

Kistler et al., "Automated Data-member Layout of Heap Objects to Improve Memory-Hierarchy Performance," *ACM Transactions on Programming Language and Systems*, (2000), 16 pages.

Kramer, "Examples of Design by Contract in Java Using Contract, the Design by Contract™ Tool for Java™", *Object World Berlin '99, Design & Components* (May 17-20, 1999), 26 pages.

Larochelle et al., "Statistically Detecting Likely Buffer Overflow Vulnerabilities", *2001 USENIX Security Symposium* (Aug. 2001), 5 pages.

Larus, "Whole Program Paths," *SIGPLAN '99 Conference on Programming Languages and Design* (1999), 11 pages.

Leavens et al., "Enhancing the Pre-and Postcondition Technique for More Expressive Specifications", *Proc. World Congress on Formal Methods in the Development of Computing Systems* (Sep. 1999), 21 pages.

Leavens et al., "Preliminary Design of JML", *Technical Report 98-06v, Iowa State University Department of Computer Science* (Jun. 1998-2003; revised May 2003), 94 pages.

Leino, "Checking Correctness Properties of Object-Oriented Programs," *Internet*, http://research.microsoft.com/leino/paper/1 (Aug. 19, 2002), 49 pages.

Melski et al., "Interprocedural Path Profiling", *University of Wisconsin* (1998), pp. 1-50.

Microsoft Corporation, "Scalable Program Analysis", *Internet*, http://research.microsoft.com/spa/ (downloaded on Sep. 5, 2003), 3 pages.

Mowry et al., "Predicting Data Cache Misses in Non-Numeric Applications Through Correlation Profiling", *International Symposium on Microarchitecture* (1997), 7 pages.

Nevill-Manning et al., "Identifying Hierarchical Structure in Sequences: A Linear-time Algorithm", *Journal of Artificial Intelligence Research* (1997), 7:67-82.

Petrank et al., "The Hardness of Cache Conscious Data Placement," *29th Annual ACM Symposium on Priniciples of Programming Languages* (2002), 33 pages.

Roth et al., "Dependence Based Prefetching for Linked Data Structures", *Proceedings of the 8th International Conference on Architectural Support* (Oct. 1998), pp. 115-126.

Sastry et al., "Rapid Profiling Via Stratified Sampling", *International Symposium on Computer Architecture* (2001), pp. 1-12.

Savage et al., "Eraser: a dynamic data race detector for multighreaded programs", *ACM Transactions on Computer Systems (TOCS)* (1997), 391-411.

Seidl et al., "Segregating Heap Objects by Reference Behavior and Lifetime", *8th Int'l Conf. on Architectural Support for Programming Languages and Operating Systems* (Oct. 1998), 12 pages.

Shaham, "Automatic Removal of Array Memory Leaks in Java", (1999), 12 pages.

Srivastava, "ATOM: A System for Building Customized Program Analysis Tools", *SIGPLAN '94 Conf. on Programming Language Design and Impl.* (1994), 25 pages.

"Technologies for Measuring Software Performance", *Intel Corporation* (2003), 4 pages.

Traub et al., "Ephemeral instrumentation for lightweight program profiling", *Technical report*, Harvard University (2000), pages 1-13.

Truong et al., "Improving Cache Behavior of Dynamically Allocated Data Structures", *PACT* (1998), 8 pages.

Wahls et al., "The Direct Execution of SPECS-C++: A Model-Based Specification Language for C++ Classes", *Technical Report TR94-02b, Iowa State University Department of Computer Science* (Nov. 18, 1994), 52 pages.

Zhou et al., "AccMon: Automatically Detecting Memory-Related Bugs via Program Counter-Based Invariants," *Proceedings of 37th International Symposium on Micro-Architecture (MICRO)* (Dec. 2004).

Zilles et al., "A Programmable Co-processor for Profiling", *Proceedings of the 7th International Symposium on High Performance Architecture* (Jan. 2001), 12 pages.

\* cited by examiner

```
function addTransition = lambda(Symbol a){            ← 816
    if(s doesn't yet have a transition for a){
818 →   s' = { [v,n+1] | n<headLen        ← 820
                      && [v,n] in s       ← 822
                      && a==v_{n+1} }     ← 824 union { [w,1] | a==w_1 }      ← 826 if(s' doesn't yet exist){         ← 828
            add s' to the states of the DFSM; ← 830
            add s' to the workList;       ← 832
        }
814
        if(s' != {})                      ← 834
            introduce the transition              ← 836
                              (a,s') for s;
        }
    }
Main ()
add {start state } to the workList;       ← 802
while(!workList.isEmpty){                 ← 804
    take state s out of workList;         ← 806
        for(each state element e in s)    ← 808    ← 812
            if(e.seen < headLen)          ← 810
                addTransition(e.hotDataStream_{e.seen+1});
                                                    ← 840
        for(each symbol a for which there exists
                    a hot data stream v with v_1 ==a)
            addTransition(a);
```

DYNAMIC PREFETCHING OF HOT DATA STREAMS

TECHNICAL FIELD

This invention relates to prefetching data in advance of when it is needed. More specifically, it relates to determining that a sequence of data fetches are the first few data fetches in a stream of data fetches, and prefetching the balance of the stream after making the determination.

BACKGROUND AND SUMMARY

The demise of Moore's law has been greatly exaggerated and processor speeds continue to double every 18 months. By comparison, memory speed has been increasing at the relatively glacial rate of 10% per year. The unfortunate, though inevitable consequence of these trends is a rapidly growing processor-memory performance gap. Computer architects have tried to mitigate the performance impact of this imbalance with small high-speed cache memories that store recently accessed data. This solution is effective only if most of the data referenced by a program is available in the cache. Unfortunately, many general-purpose programs, which use dynamic, pointer-based data structures, often suffer from high cache miss rates, and are limited by their memory system performance.

Prefetching data ahead of use has the potential to tolerate the growing processor-memory performance gap by overlapping long latency memory accesses with useful computation. Prefetching techniques have been tried with scientific code that access dense arrays in loop nests. However, these techniques rely on static compiler analyses to predict the program's data accesses and insert prefetch instructions at appropriate program points.

However, the reference pattern of general-purpose programs, which use dynamic, pointer-based data structures, is much more complex, and the same techniques do not apply. Thus, a solution for general-purpose programs, especially pointer-chasing code written in languages such as C and C++, remains unknown.

Prefetching is one way to deal with this growing disparity in processor versus memory access speeds. The idea in general is to predict what will be needed and fetch it before it is needed, so the processor will have the data when it is required. As the gap between memory speed and processor speed widens, you need to predict further and further ahead in order to have the data there when the processor needs it. Current prefetch solutions fall into two categories—hardware prefetching and software prefetching.

Hardware prefetching is incorporated in the processors. The problem with hardware prefetching is that it relies on the fact that some programs have spatial locality. Spatial locality labors under the premise that if the program touches some data object, it is next likely to touch another data object in a nearby memory address space. So when a program asks for a data object, the hardware prefetches data objects in the memory space near the fetched object. The problem with the spatial locality assumption, is that it only works for some types of programs. For example, it works with scientific programs which often store information in spatially concentrated arrays. But for many modem programs, which include pointers, that turns out not to be the case. So hardware prefetching does not work very well as a general purpose solution.

Software prefetching statically evaluates the code sequence, and tries to predict what the program will access ahead of time. The problem with this static methodology, occurs when the program under analysis has pointers. Since the pointer targets are not loaded into memory during static analysis, the prefetch addresses are unknown. Thus if the program has pointers in a dependence chain, the static analysis breaks down. Again, programs that use arrays for data storage can benefit from this sort of static code sequence analysis, but for general purpose modem programs, present software prefetch schemes do not work. They cannot determine what addresses the pointers are accessing far enough ahead of time to make the solution viable. Static software analysis breaks down because of the memory access dependencies that can not be resolved statically.

With static software prefetch techniques, the analysis can determine where a pointer points and fetch that address, but that is only one address ahead. For example, in FIG. 1, a static analysis can determine where a data object 102 points 104, and fetch the object 106 at that address. However, that object 106 needs to be fetched, before a pointer 108 to the next object 110 can be determined. This creates a timing dependence chain that is prohibitive, because objects need to be fetched before you can fetch the next object.

The present technology is directed towards dynamically creating and injecting code into a running program. The injected code identifies the first few data fetches in a given hot data stream, and prefetches the remaining data elements in the stream so they are available when needed by the processor. The injected code identifies the first few elements in a hot data stream (i.e. the prefix), and fetches the balance of the elements in the stream (i.e., the suffix). A hot data stream has a couple of valuable properties. First, they are hot, meaning they occur frequently which is good for optimization. Second, they occur over and over again in the same order. So for a hot data stream, once the prefix is seen, the suffix is prefetched so it is in memory by the time needed by the processor needs it. Since the hot data stream identification code and prefetch code is injected at run time, there are no time dependencies for the pointers, since the memory data addresses are known. This is a form of optimization since the data is available sooner.

For an additional optimization, a deterministic finite state machine (DFSM) is built to help create conceptual logic that is injected into the program for prefix identification and suffix prefetching. Further, in one implementation, a DFSM machine is built for each of multiple hot data streams. For a further optimization, a global single DFSM is built for multiple hot data streams. This global DFSM takes advantage of the fact that a global DFSM can reuse states for multiple hot data streams. The global DFSM is used to create conceptual logic that is injected into the executing program. As before, once the elements in the prefix are identified by the injected code, the elements in the corresponding suffix are prefetched by the injected code.

Additional features and advantages will be made apparent from the following detailed description of the illustrated embodiment which proceeds with reference to the accompanying drawings.

BRIEF DESCRIPTION OF THE DRAWINGS

FIG. 8 is pseudo-code illustrating how to create a DFSM.

DETAILED DESCRIPTION

In the following detailed description, one implementation of a dynamic prefetch method and system according to the invention is discussed with reference to the associated drawings.

Figure 1:
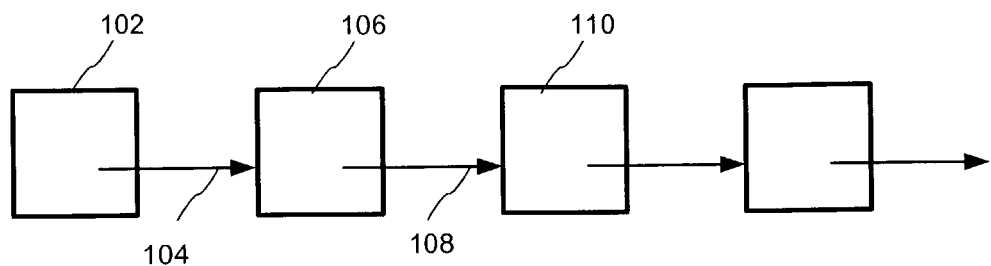
FIG. 1 is a diagram of data objects illustrating a time dependency of static prefetch analysis.
Figure 2:
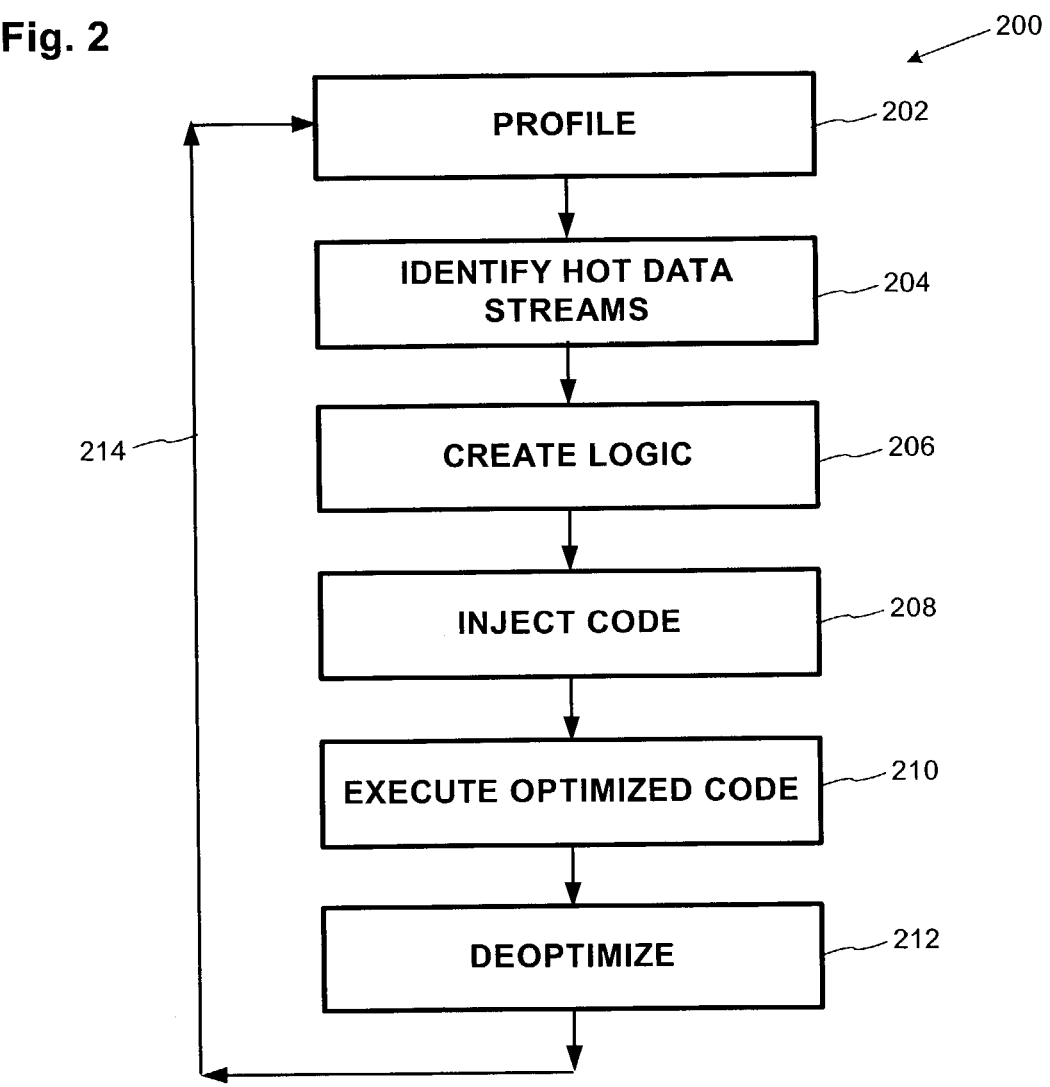
FIG. 2 is a flow chart for a method performing profiling and optimization.

The described dynamic prefetch technique runs on any standard stock hardware, is completely automatic, and works for general-purpose programs, including pointer-chasing codes written in weakly-typed languages, such as C and C++. FIG. 2 is a flow chart for a method performing dynamic profiling and dynamic prefetching. This represents one context where dynamic prefetching is employed. The profiling phase 202 gathers a temporal data reference profile from a running program with low-overhead. Next, the profiling is turned off and a fast analysis algorithm extracts hot data streams 204, which are data reference sequences that frequently repeat in the same order. Next, logic or code is created 206, which identifies a hot data stream prefix, and fetches the corresponding suffix. Then, the system dynamically injects the created code 208 at appropriate program points to detect and prefetch these hot data streams. The process then enters the hibernation phase where no profiling or analysis is performed, and the program continues to execute 210 with the injected prefix detection and prefetch instructions. Finally, the program is de-optimized 212 to remove the dynamically injected code, and if desired, control returns to the profiling phase 202. For long-running programs, this cycle will repeat 214, possibly multiple times.

This automatic and dynamic prefetching scheme works for general-purpose programs. The prefetching is driven by the hot data streams supplied by the online profiling and analysis framework 202, 204.

Prefetching data ahead of use has the potential to tolerate this growing processor-memory performance gap by overlapping long latency memory accesses with useful computation. The described dynamic prefetching is accurate— correctly anticipating the data objects that will be accessed in the future—and timely—fetching the data early enough so that it is available in the cache when required.

For programs with transitional behavior, a dynamic prefetching scheme that adapts to program transitions may perform better. For example, a program that adds or subtracts pointers to data objects during execution, would allow a dynamic re-profiling and code re-injection to account for the changing conditions. An embodiment performs best in a dynamic framework for runtime detection of hot data streams and demonstrates that this can be accomplished with extremely low-overhead. Rather than collect the trace of all data references, this dynamic framework uses sampling to collect a temporal data reference profile. This is accomplished as discussed in Chilimbi, T., DYNAMIC TEMPORAL OPTIMIZATION FRAMEWORK, patent application Ser. No. 10/305,056, filed on Nov. 25, 2002, which is incorporated herein by reference. The algorithm discussed therein incrementally builds grammar representation of the traced data references. Once sufficient data references have been traced, profiling is turned off and the analysis and optimization phase begins. A fast analysis algorithm extracts hot data streams from the grammar representation. The dynamic profiling described in the incorporated application provides one example of a source of hot data streams that are used as input to the dynamic prefetch embodiment discussed herein.

Hot data streams consist of a sequence of <pc, addr>pairs. For example, in the hot data stream abacdce, each element (i.e., a, b, a, . . . e) represents a pair of values (i.e., <a.pc, a.addr>, <b.pc, b.addr>, <a.pc, b.addr> . . . <e.pc, e.addr>). The pc value (i.e., a.pc), is the program counter, which indicates the address in the executing program, where a data fetch instructions is located. The addr value (i.e., a.addr), is the memory location where the a.pc fetch instruction is pointing and where the data object is obtained. During execution, when the a.pc fetch instruction executes, the processor fetches the data object at the a.addr location.

The hot data stream analysis 202, 204 is configured to detect streams that are sufficiently long to justify prefetching. The minimum efficient hot data stream length was empirically determined to be 10 elements long (e.g., prefix=2, suffix=8, total=10 elements). However, as the disparity between processing speed and memory bus speed increases due to Moore's law, this number may need to increase. Once these streams have been identified 202 and determined to be hot 204, the method 200 dynamically injects 208 checks in the program to match stream prefixes, and injects 208 prefetch instructions for fetching the remaining stream addresses in the suffix.

The dynamic prefetch method uses a dynamic implementation of Vulcan, by Microsoft Corporation (a binary editing tool for the x86), to inject checks into the program that implement the prefix matching. In addition, it injects prefetch instructions that target and prefetch the remaining hot data stream suffix addresses, on successful prefix matches. The executing program (or thread) can be temporarily frozen while these changes are made to the program's (or thread's) binary image.

For example, given a hot data stream abacdce, once the addresses a.addr, b.addr, a.addr are detected by checks inserted at a.pc, b.pc, and a.pc, prefetches are issued for the addresses, c.addr, d.addr, e.addr. The hot data stream prefix length that must match before suffix prefetching is initiated, needs to be set carefully. A prefix that is too short may hurt prefetching accuracy, and a prefix that is too large, reduces the prefetching opportunity and incurs additional prefix stream matching overhead. Conceptually, one can think of the prefix-matching mechanism for a hot data stream as corresponding to a deterministic finite state machine (DFSM), where the states correspond to possible stream prefixes, and transitions are implemented by inserted prefix-match checks.

Figure 3:
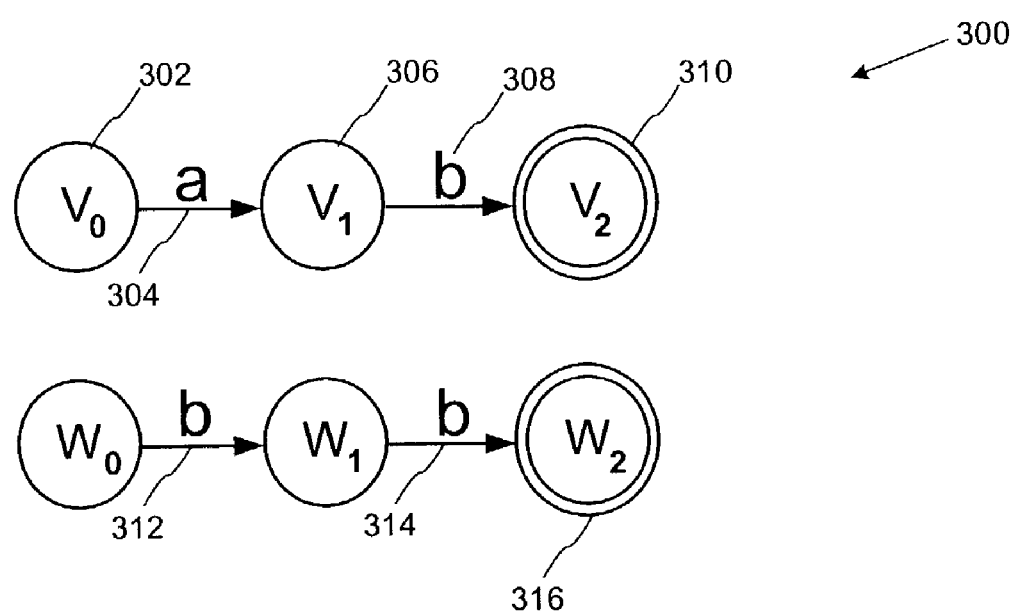
FIG. 3 is an illustration of separate deterministic finite state machines used for prefetch detection.

Table 1 contains two hot data streams V and W, which are used to demonstrate the Example DFSMs illustrated in FIG. 3.

TABLE 1

V = abacadae
W = bbghij

As shown in FIG. 3, separate DFSMs 300 can be created for each hot data stream (e.g., V and W). The DFSM for hot data stream V, has a start state $V_0$ 302. While in the start state 302, if the executing program encounters the <a.pc, a.addr>data fetch 304, the DFSM transitions to a second state $V_1$ 306. While in the second state 306, if the executing program next encounters a data fetch for any data element other than the <b.pc, b.addr>fetch, then the state machine transitions back to the start state $V_0$ 302. However, if while in the second state 306, if the executing program next encounters the <b.pc, b.addr>data fetch 308, the DFSM enters an accepting state $V_2$ 310 for the V hot data stream. Upon entering the accepting state 310, the suffix for V is prefetched, namely, the data objects at a.addr, c.addr, a.addr, d.addr, a.addr, and e.addr. In this case, since a.addr is already in memory, only c.addr, d.addr, and e.addr need to be fetched. For hot data stream W, when the bb prefix 312, 314 is encountered, the accepting state is entered 316, and the suffix is prefetched, namely, g.addr, h.addr, i.addr, and j.addr. Again, the DFSMs are conceptual representations that can be constructed by a dynamic prefetch engine to reduce the complexity of creating instructions that are injected into program. However, reduced complexity (e.g., a DFSM) is not a requirement for creating logic for a program that detects prefixes and prefetches suffixes, it just make it easier.

However, to avoid redundant checks, and efficiently orchestrate matches for all hot data streams, one implementation of a prefetching engine constructs a single DFSM that keeps track of matching prefixes for all hot data streams simultaneously.

Conceptually, each hot data stream V corresponds to a deterministic finite state machine (DFSM) v.dfsm, where the states are represented by v.seen and the detection code implements the transitions. Instead of driving one DFSM per hot data stream, a global integrated DFSM keeps track of prefix matching for all hot data streams simultaneously. By incurring the one-time cost of constructing a single global DFSM, the frequent detection and prefetching of hot data streams runs faster.

Before describing how to create a DFSM that matches plural hot data streams simultaneously, consider the code that would need to be generated to drive it. Without a loss of generality, let S={0, . . . , m} be the set of states and let A be the set of data elements (symbols) that appear in prefixes of hot data streams (e.g., abcdefghij). The transition function d:S*A→S indicates that while in a state s, and the data reference "a" is observed, the state transitions to S' (i.e., s'=d(s,a)). In other words, a.pc has injected instrumentation of the form:

```
a.pc: if((accessing a.addr) && (state==s)) then
    state=s';
```

Additionally, some states s in S (i.e., accepting states) would be annotated with prefetches (s.prefetches), for the suffixes of the streams that have been completely matched when state s is reached. Thus, the instrumentation would become

```
a.pc: if((accessing a.addr) && (state==s)){
    state = s';
    prefetch s'.prefetches;
}
```

Figure 4:
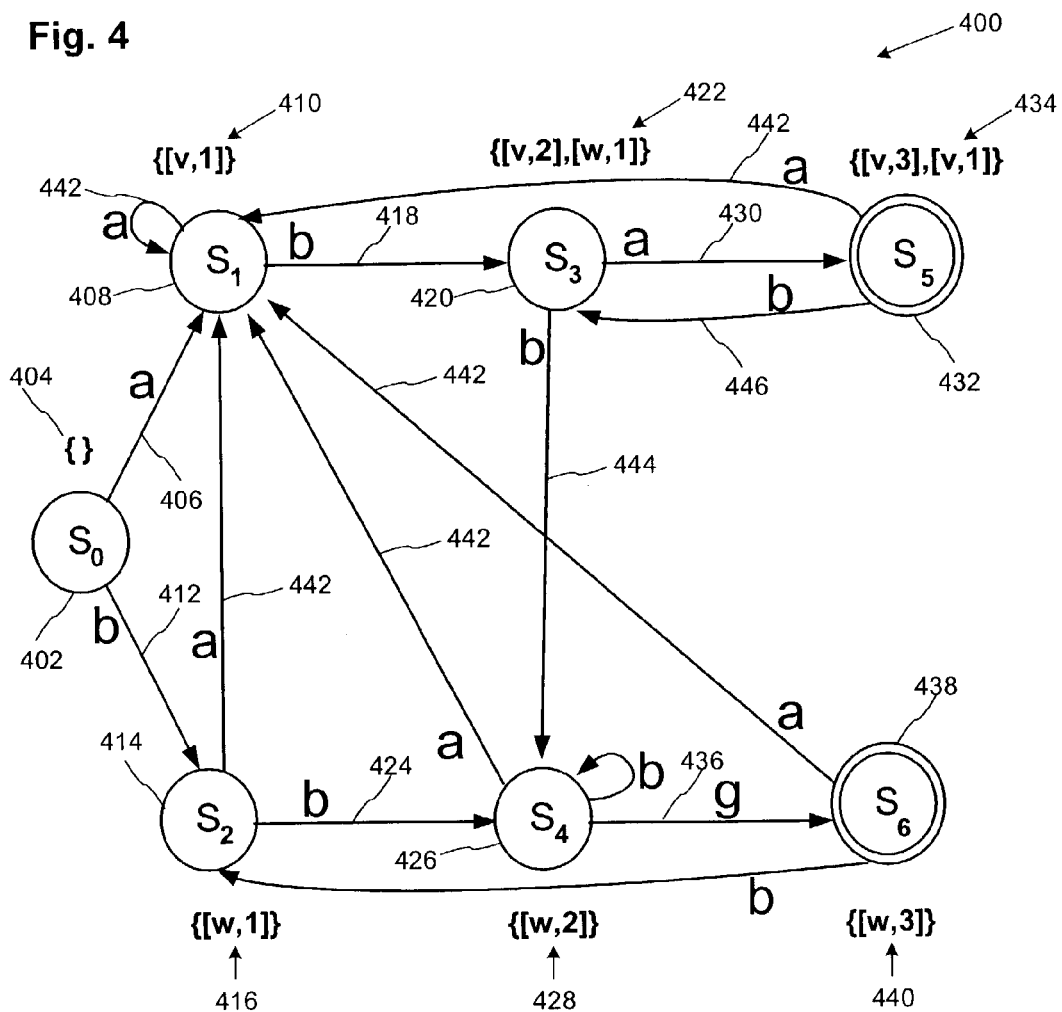
FIG. 4 is a deterministic finite state machine that simultaneously detects plural hot data streams.

Thus, given plural hot data streams as input, a global DFSM is created that detects the prefixes for both of the example hot data streams—V and W (Table 1). As shown in FIG. 4, this DFSM (400) identifies hot data streams for V and W with a prefix of three.

A global DFSM, includes a start state $S_0$ (402), which includes an empty set 404 of hot data streams seen. In order to build a global DFSM 400, a method looks at the first input element in each hot data stream, and introduces a transition edge from the start state to a next state for each unique first data element in the hot data streams. In this case, there are two hot data streams with unique first elements, namely V has "a" and W has "b". The first element in V is an "a" 406, so a transition edge is introduced to a next state $S_1$ (408). This state 408, holds state information 410 indicating the first element in V has been seen (i.e., {[v,1]}, or v.seen==1). The first element in W is a "b" 412, so a transition edge is introduced to a next state $S_2$ (414). This state 414, holds state information 416 indicating the first element in W has been seen (i.e., {[w,1]}, or w.seen=1).

Next, the second element in each hot data stream is examined. In this case, V has the second element "b", and W has the second element "b". From state $S_1$ 408, a transition is introduced 418 to a new state $S_3$ indicating that the second element "b" in hot data stream V has been seen. The new state holds state information 422 indicating that the second element in V has been seen (i.e., {[v,2],[w,1]} or v.seen=2). The method then checks whether or not the second element in V is the first element in any other hot data stream. In this case, the second element in V is also the first element in W, so the state information 422 also indicates that for this state 420, the first element in W has been seen (i.e., {[v,2],[w,1]} or w.seen=1). From state $S_2$ 414, a transition is introduced 424 to a new state $S_4$ indicating that the second element "b" in hot data stream W has been seen. The new state holds state information 428 indicating that the second element in W has been seen (i.e., {[w,2]} or w.seen=2). The method then checks whether or not the second element in W is the first element in any other hot data stream. In this case, the second element in W is not also the first element in another hot data stream, so no additional state information needs to be added 428.

Next, the third element in each hot data stream is examined. In this case, V has the third element "a", and W has the third element "g". From state $S_3$ 420, a transition is introduced 430 to a new state $S_5$ 432 indicating that the third element "a" in hot data stream V has been seen. The new state holds state information 434 indicating that the third element in V has been seen (i.e., {[v,3],[v,1]} or v.seen=3). The method then checks whether or not the third element in V is the first element in any other hot data stream. In this case, the third element in V is also the first element in V, so the state information 434 also indicates that for this state 434, the first element in V has been seen (i.e., {[v,3],[v,1]} or v.seen=1). From state $S_4$ 426, a transition is introduced 436 to a new state $S_6$ 438 indicating that the third element "g" in hot data stream W has been seen. The new state holds state information 440 indicating that the third element in W has been seen (i.e., {[w,3]} or w.seen=3). The method then checks whether or not the third element in W is the first element in any other hot data stream. In this case, the third element in W is not also the first element in another hot data stream, so no additional state information needs to be added 440.

Next, the moment there is some failure, rather than going all the way back to the start state $S_0$ 402, if possible, the method directs the state to some partial hot data stream prefix state. For example, for most states, if an "a" is encountered, the method introduces a transition 442 to the V hot data stream state indicating the first element "a" in V has been seen 410. Additionally, in this three prefix case, a transition can be introduced 444 to a partial state 426 when the first element in a string has already been seen 422 (i.e., "b" in W, {[w,1]}), and the present element "b" represents the second element in a hot data stream. However, failures that represent no other partial state, are returned to the start state 402. Thus, using the described method, an optimized global DFSM is produced for a set of two or more hot data steams.

When a string of prefix elements reach an accepting state 432, 440, the data objects represented by the suffix elements are prefetched. These accepting states 432, 440, indicate that the first three elements (i.e., the prefix), have been identified, and the balance of the hot data stream is prefetched.

After the profiling and analysis phase finds the hot data streams, the dynamic prefetch method matches prefixes and prefetches suffixes. The dynamic prefetch method uses a fixed constant headLen to divide each hot data stream $v=v_1, v_2, \ldots v_{\{v.length\}}$ into a head, $v.head=v_{1\ v2} \ldots v_{headLen}$, and a tail, $v.tail=v_{headLen+1}, v_{headLen+2}, \ldots v_{\{v.length\}}$. When the dynamic prefetch method detects the data references of v.head (i.e., the prefix), it prefetches from the addresses of v.tail (i.e., the suffix).

Figure 5:
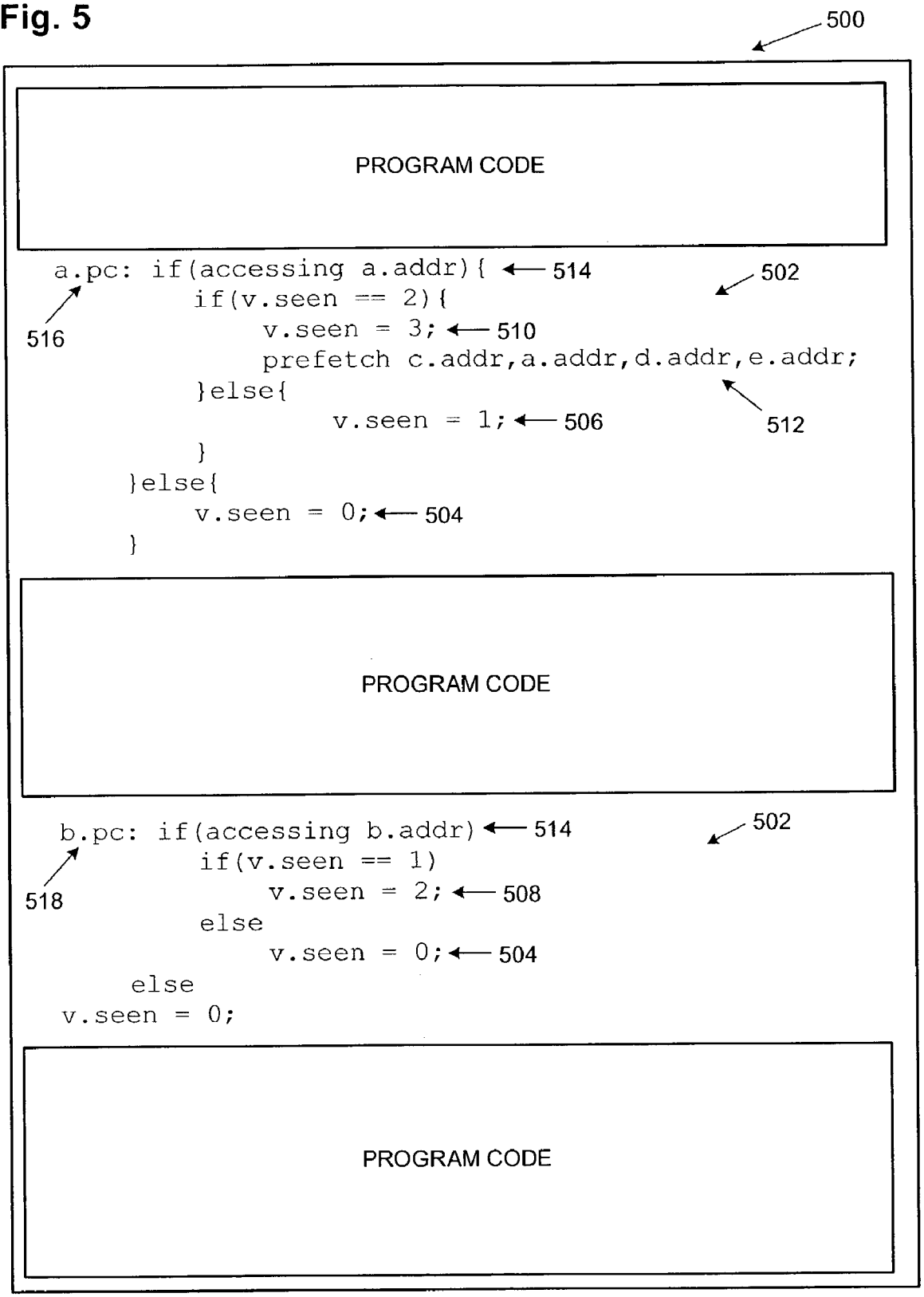
FIG. 5 is a binary image of an instrumented procedure.

In one embodiment, as shown in FIG. 5, code is injected into a program 500 to determine when the prefix has been encountered. In one example, code is injected for determining when a prefix match is made requiring a suffix prefetch. In a first simple case, when headLen=3 and there is only one hot data stream, V=abacadae, the detection/matching code makes use of a counter called v.seen, that keeps track of how much of v.head has been matched. For example, when v.seen=0 (504), nothing has been matched. When v.seen=1 (506), a partial match of "a" has been made. When v.seen=2 (508), a partial match of "ab" has been made. Finally, when v.seen=3 (510), a complete match of "aba" has been made for the prefix v.head=aba. Upon this determination, the prefetch instructions 512 are also in the injected code to prefetch the addresses in v.tail (i.e. prefetch data objects from addresses c.addr, a.addr, d.addr, a.addr, and e.addr). In order to increment the v.seen variable, to check the data object fetch addresses 514, and to prefetch the suffix data object addresses 512, detection code and prefetching code is injected into the program. The detection code is injected at the pc's of the v.head (i.e., at a.pe 516, b.pc 518). The code injected at the pc's of the v.head determine whether the prefix fetched addresses are at the required address (i.e., a.addr, b.addr). As previously discussed, a data element of a hot data stream is represented by a <pc, addr>pair (e.g., <a.pc,a.addr>). Thus, the code injected at a.pc 516 verifies the data object fetch address is a.addr 514.

As shown in FIG. 5, a pseudo-code implementation for code injection at a.pc is considered. The pseudo-code 500 exploits the fact that the same symbol "a" occurs multiple times in v.head=aba. Also note that the cases of initial element 506, failed transition element 504, and complete prefix match 510 are covered in the pseudo-code. The initial match of data element "a" works regardless of how much of v.head we have seen. A failed match resets v.seen to 0.

A complete match, besides driving v.seen=3, prefetches the addresses in v.tail 512. Finally, note that it is possible that a.pc==b.pc, in which case the "if (accessing b.addr)" clause would appear in a.pc's instrumentation. The discussion now considers a way to detect and fetch multiple hot data streams. In a first embodiment, a variable x.seen is introduced for each hot data stream X, and detection and prefetch instruction for each x.pc is injected independently in the code. While this simple approach works, it may lead to redundant work. Consider, for example, the hot data streams v=abacadaeand and w=bbghij. When v.seen==2, it is also true that w.seen=1. This redundancy can be eliminated by combining the matching of V and W (as shown in FIG. 4, 422, 434). This optimization even holds within a single hot data stream prefix, for example, as shown in FIG. 4 at state $S_4$. There, when w.seen==2, and another b is encountered, w.seen is kept at 2.

A dynamic prefetch method uses Dynamic Vulcan (DV) by Microsoft Corporation to inject the detection and prefetching code into the running binary image. First, DV is directed to stop all running program threads while binary modifications are in progress and restarts them on completion (see FIG. 12). Then, for every procedure that contains one or more pcs where injected code is required (e.g., see FIG. 6), the dynamic prefetch method directs DV to do the following. First, DV is directed to make a copy of the procedure. Second, DV is directed to inject the dynamic detection and prefetch code into the copy at the prefix pcs. Third, DV is directed to overwrite the first instruction of the original procedure with an unconditional jump to the copy. This single jump instruction which redirects control flow is optimal, because later during de-optimization, the jump instructions is simply removed, but can be replaced again if re-profiling determines that the copy should continue to execute.

In this embodiment, the dynamic prefetch method does not patch any pointers to the original code of procedures in the data of the program. In particular, the return addresses on the stack still refer to the original procedures. Hence, returns go to the original procedures for at most as many times as there were activation records on the stack at optimization time. This is safe, but may lead to a few missed prefetching opportunities.

Figure 6:
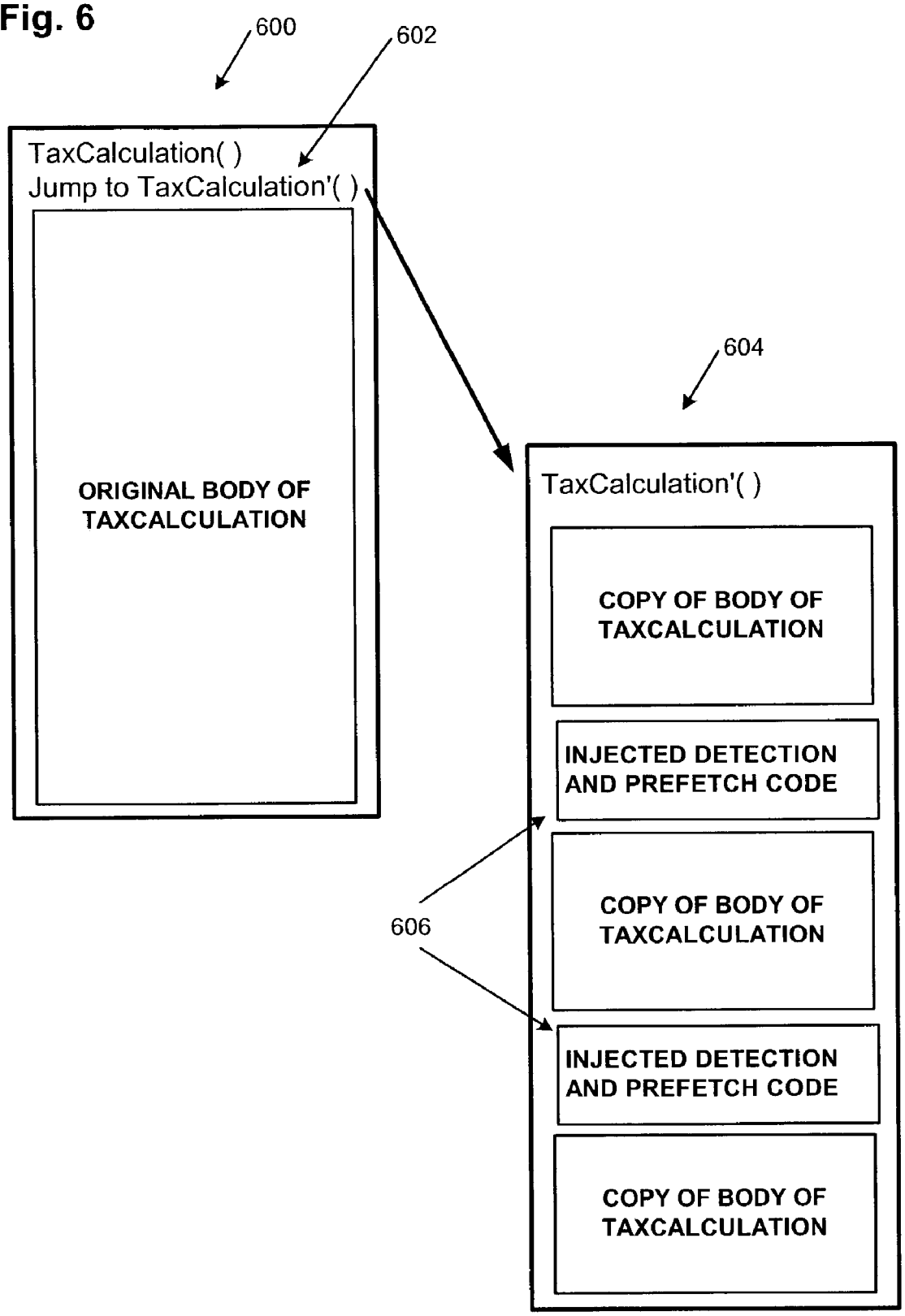
FIG. 6 is a binary image of an original procedure containing a jump instruction to a copy of itself with added prefix detection and suffix prefetch instructions.

Consider a procedure called TaxCalculation() 600 as shown in FIG. 6. A jump instruction is injected into Tax-Calculation() at the top 602. The jump is to a copy of TaxCalculation(), called TaxCalculation'() 604. The prefix detection and prefetch instructions are added to TaxCalculation'() 606. Thus, when TaxCalculation() is called from anywhere in the program, TaxCalculation'() executes instead. The single injected "jump" instruction is an efficient way to handle this, because the jump instruction is just removed during de-optimization. For example, during re-profiling it may be determined that a few items are deleted from a linked list. This is discovered during a second iteration of profiling in the process 200. If the profiling analysis determines that nothing has changed and the prefetch instructions will remain the same as in TaxCalculation'(), then you just put the jump instruction back. If the prefetch code for TaxCalculation'() has changed based on a condition discovered during a subsequent iterative profiling, then the detection and prefetch code in TaxCalculation'() is changed accordingly. Thus, in this embodiment TaxCalculation'() is really a copy of TaxCalculation'() in another part of the code space, with the detection and prefetch code added. So TaxCalculation'(), along with other procedures containing a prefix pc for any of the hot data streams, will include the prefetch code as well as the logic for implementing the DFSM machine.

Further, in this dynamic environment, the code injected dynamically may be removed as subsequent profiling continues. As shown in FIG. 2, this dynamic process 200 profiles a running application 202, and determines one or more hot data streams 204 from the information obtained during profiling. These hot data streams are used to construct logic 206 (e.g., DFSM) which identifies the prefixes and prefetches the suffixes. This logic is then injected 208 into the program. The code is then de-optimized 212 (e.g., remove jump instructions) and the process returns to profiling 214. In other embodiments, the profiling could occur while the prefetch code remains injected.

The size of a DFSM is relatively small when the hot data streams are collapsed into one DFSM. This is important because it could grow in size exponentially if separate DFSM are implemented for a growing number of identified hot data streams. By combining it into a global DFSM, it reduces the size of the machine and the resulting injected code to a manageable size.

The described dynamic prefetch optimization is very sensitive to what parameters are used. The overhead of the entire method 200 can be as high as 12%, but the benefits are about 20–30% after subtracting the overhead. And, as the core processor speed increases in speed in relation to the memory bus speed, this benefit (20%–30%) will increase accordingly.

Once the condition for doing a prefetch is satisfied, (i.e., the prefix is found "aba"), then the prefetch occurs. In this embodiment, the prefetch is not canceled even if the next element actually required by the running optimized program is not the same as what was expected in the suffix. This unnecessary prefetch may fetch data not actually used. However, this is included in the real time analysis of overhead, since the benefits of 20–30% are empirically observed. Even if a given prefetch is wrong, these are hot data streams, and it will likely be used within a short period of time. So in this embodiment, nothing is tracked beyond the prefix. However, this information could be used in another embodiment to trigger re-profiling at an earlier time.

Notice that once you are executing in an instrumented procedure 500, it is too late to prefetch a prefix data element such as a.pc (its already in memory), but the value of the dynamic prefetch method is that once we have seen the last data element in the prefix 510, it is very likely that these other data fetches (suffix fetches) 512 which may be in other procedures or elsewhere in the program, are likely to follow shortly. So they are prefetched, and brought into a location of faster memory, so they will be more immediately available when needed by the processor. So the memory addresses in the suffix are fetched without regard to what procedure they are later called from by the executing computer program. The information about memory locations used to prefetch the suffix data objects, is obtained from the input elements (e.g., c.pc, c.addr) from the hot data streams created from the information obtained during dynamic (or static) profiling.

Figure 7:
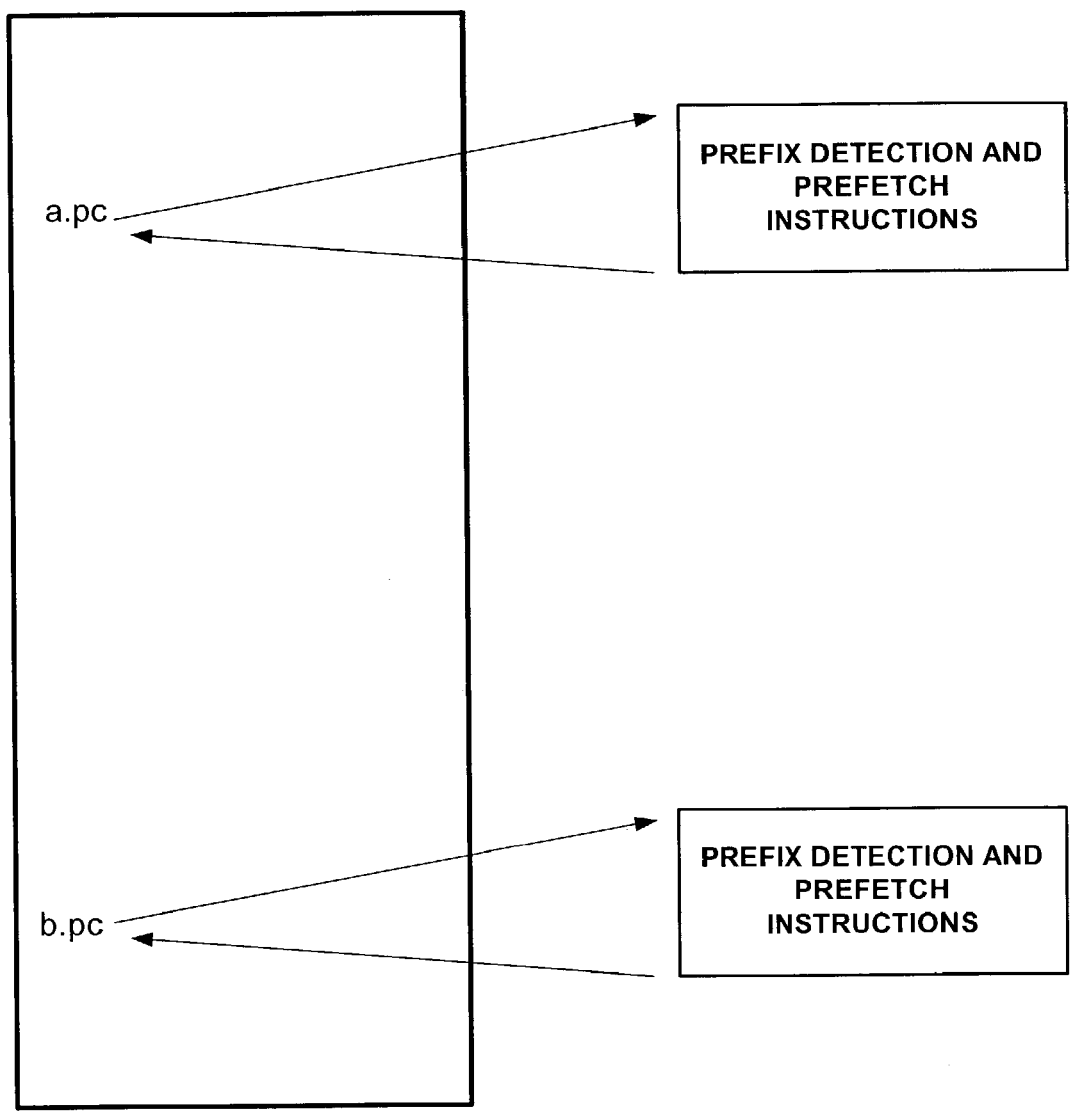
FIG. 7 is a binary image containing jump instructions from each instrumented pc to instrumented code and back.

In another embodiment, as shown in FIG. 7, the original procedure 700 is instrumented with a jump instruction at each prefix pc (e.g., a.pc, b.pc). In such an embodiment, instead of creating a copy of each procedure (as shown in FIG. 6), execution flow jumps to execute the prefix detection and prefetch code, and then back to the original procedure to implement this original procedure body. However, it is much easier to do one jump at the top of the procedure as illustrated in FIG. 6. The FIG. 6 implementation also has the advantage of just removing a single injected jump instruction during de-optimization.

FIG. 8 is pseudo-code for receiving a set of hot data streams, and constructing a global DFSM with the optimal prefix size of two data elements. However, once armed with this disclosure, one skilled in the art could construct many ways to create a DFSM or otherwise create dynamically code for injecting prefix detection and suffix fetching into a computer program. A state is a set of state elements, where each state element e is a pair (e.g., [v,2]) of a hot data stream e.hotDataStream and an integer e.seen. If the current state is s={[v,2],[w,1]}, this means the prefix matcher has seen the first two data accesses of the hot data stream v, and the first data access of hot data stream w, and no data accesses of any other hot data streams. State $S_0=\{\}$ is the start state where nothing has been matched.

Let s be a state, and let "a" be a data reference. The transition function, d:S*A→A, yields a target state (set of state elements) as follows:

$$d(s,a)=\{[v,n+1]/n<\text{headLen} \&\& [v,n] \text{ in } s \&\& a==v_{\{n+1\}}\}\text{union } \{[w,1]/a==w_1\}$$

In this equation, for a hot data stream v, the notation [v,n] indicates that n elements of the v prefix have been seen. Thus, when the next element in v is seen, the notation becomes [v,n+1] in the next state. The notation n<headLen indicates that n should remain less than the prefix length so it stops at the accepting state. Then for all prefixes w, where the new element is the first element in that prefix, add that indication to the new state [w, 1].

A global DFSM is constructed with a lazy work-list algorithm starting from a start state $S_0$. The DFSM is represented as a directed graph, where the nodes are reachable states and a transition d(a,s) is stored as an edge from s to d(a,s) labeled with "a". FIG. 8 shows the pseudo-code for developing the global DFSM. A data stream must reach a certain regularity magnitude (or heat (H)) before it is considered a hot data stream. Given a data stream v, heat is measured as v.heat=v.length*v.frequency. Let n be the number of hot data streams, then n<=100, if H is set such that each hot data stream covers at least 1% of the profiled period. Then there are headLen*n different state elements, and thus, up to $2^{(headLen*n)}=O(2^n)$ different states. However, using this algorithm, usually up to headLen*n+1 states are empirically observed.

Figure 9:
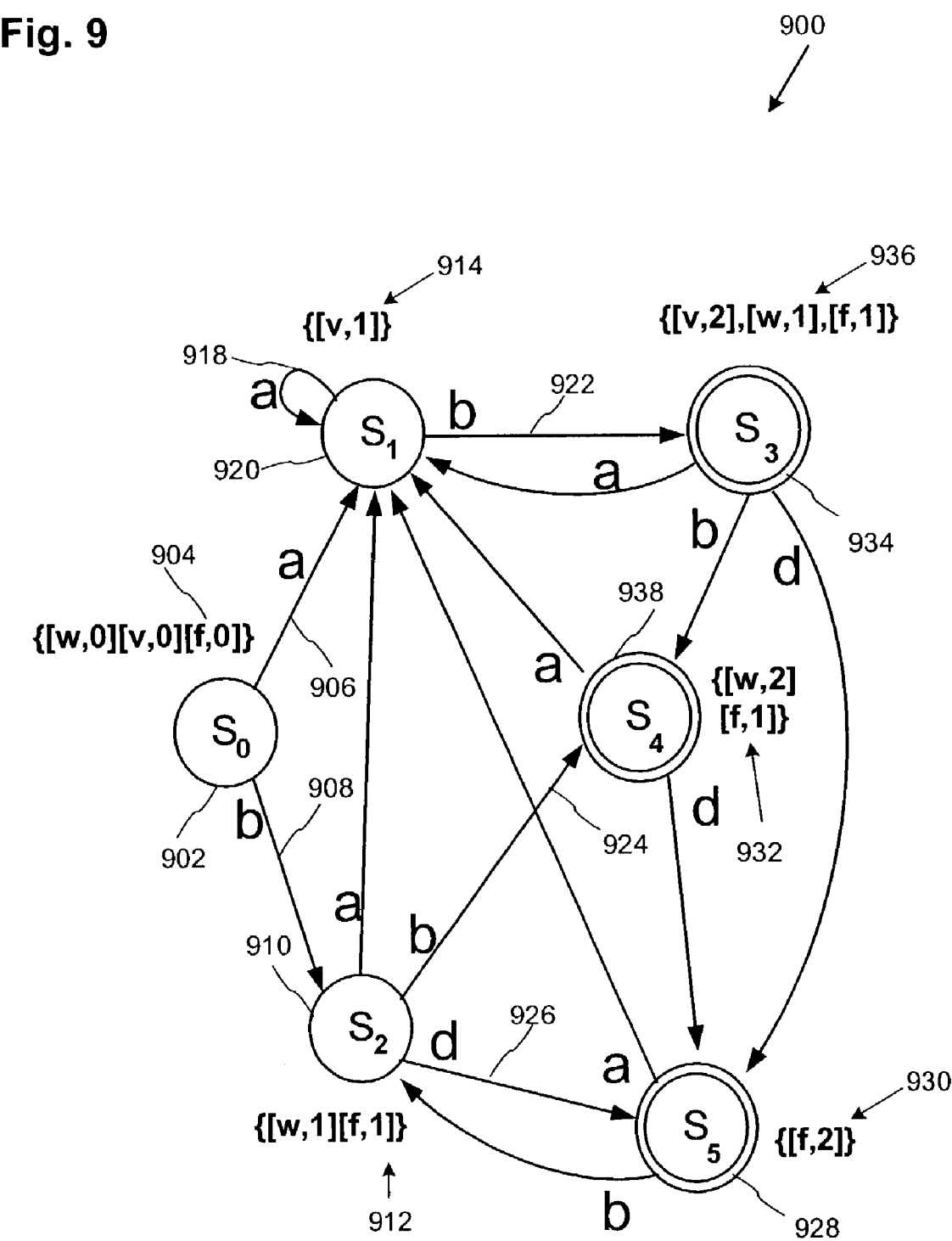
FIG. 9 is a DFSM that simultaneously detects plural hot data streams.

Using three hot data streams shown in Table 2, and a prefix of two, the algorithm 800 is used to create a DFSM representation as shown in FIG. 9.

TABLE 2

| |
|---|
| V = abadae |
| W = bbghij |
| F = bdfiopliwq |

As shown in FIG. 9, the algorithm first creates a start state $S_0$ 902. Then it goes through all the hot data streams, and adds a transition edge for each of the unique first elements a and b 906, 908. Then it adds two new states $S_1$ 920 and $S_2$ 910. $S_1$ represents a state that has seen the first element of the prefix for V, which is represented by the notation {[v,1]} 914, and $S_2$ represents a state that has seen the first element of the prefix for both W and F, which is represented by the notation {[w,1],[f,1]} 912. Then the algorithm looks at the second element in the prefix. From state $S_1$, one next element could be b 922. Thus a new state is created $S_3$ 934 reflecting an accepting state since the prefix of two has been satisfied for hot data stream V, which is represented by the notation {[v,2]} 936. In addition to creating another state $S_3$ 934, the method also looks for other prefixes where b is the first transition for the prefix. In this case, there are two prefixes (F and W) that have b as a first element so {[w,1], [f,1]} is added to the set of states 936.

The method continues looking at the second element of the other prefixes W and F. In this case, the second element in W is b, so a transition is created 924 to a new accepting state $S_4$ 938, which is represented by the notation {[w,2]} 932. Next, the method continues looking at the second element of the prefix from state S2. In this case, the second element in F is d, so a transition is created 926 to a new accepting state $S_5$ 928, which is represented by the notation {[f,2]} 930. Since 2 is the preferred prefix length, the algorithm 800 determines a global DFSM 900, that contains all the combinations of the hot data stream prefixes that obtain an accepting state. The idea is that the over head for the entire process (profiling, creating hot data streams, creating an DFSM, and injecting prefetch code) cannot be overly complicated, because it is all done dynamically as the program executes (when the pointer information is locatable). So it has to be done really fast in order to meet this criteria. Again, a prefix length of two, with a hot data stream of at least ten elements seems to work optimally (i.e., prefix=2, suffix=8) for current machines.

Using the three hot data streams from Table 2, an example trace of FIG. 8 is discussed in association with the following Table 3.

TABLE 3

| Row | Current State (s) | Transition | Next State (s') |
| --- | --- | --- | --- |
| 1 | [v, 0][w, 0][f, 0] | a | [v, 1] |
| 2 | [v, 0][w, 0][f, 0] | b | [w, 1][f, 1] |
| 3 | [v, 1] | b | [v, 2][f, 1][w, 1] |
| 4 | [v, 1] | a | [v, 1] |
| 5 | [w, 1][f, 1] | b | [v, 2][f, 1][w, 1] |
| 6 | [w, 1][f, 1] | d | [w, 2][f, 1] |
| 7 | [w, 1][f, 1] | a | [v, 1] |
| 8 | [v, 2][f, 1][w, 1] | b | [w, 2][f, 1] |
| 9 | [v, 2][f, 1][w, 1] | d | [f, 2] |
| 10 | [v, 2][f, 1][w, 1] | a | [v, 1] |
| 11 | [w, 2][f, 1] | d | [f, 2] |
| 12 | [w, 2][f, 1] | a | [v, 1] |
| 13 | [w, 2][f, 1] | b | [w, 1][f, 1] |
| 14 | [f, 2] | a | [v, 1] |
| 15 | [f, 2] | b | [w, 1][f, 1] |

The start state is added to the work list 802. This is reflected in the Table as shown in Row 1, where the start state indicates that no prefix elements have been seen for any hot data stream prefix. In FIG. 8, "s" indicates the current state and "s'" indicates the next state. While following this trace, assume that the table is empty until the discussion introduces content into the table. Since the work-list contains at least one state (i.e., [v,0][w,0][f,0]), the work-list is not empty 804, and execution continues in the while-loop 804. The only state (i.e., [v,0][w,0][f,0]) in the work-list is removed 806. Then for each element in the current state "s" (i.e., [v,0][w,0][f,0]) 808, that does not represent an accepting state 810, the addTransition function is called with the next symbol in that prefix 812. For example, in the current state s (i.e., [v,0][w,0][f,0]), zero elements have been seen for V, so addTransition is called with v.hotDataStream v.seen+1 812. In this case, v.seen is zero (i.e., [v,0]), so v.seen+1 is the first element in hot data stream V. So addTransition is called with "a", the first prefix element in V (i.e., addTransition(a)).

The addTransition function 814 first checks 816 whether the current state (i.e., [v,0][w,0][f,0]) has a transition for "a". As discussed, assume the table is empty except for content added. Since only the current state s (i.e., [v,0][w,0][f,0]) has been added to the table, no transitions are present. Since no transitions are present for the current state (i.e., [v,0][w,0] [f0]) 816, a next state s'=[v,n+1] is created 818, as shown in Row 1, if the following conditions are true. First, n<headLen 820, meaning a next state element s'=[v,n+1] should not be added for any prefix (i.e., V, F, or W) that is already in an accepting state. Second, a next state element s'=[v,n+1] should not be added for any prefix that prefix is not present in the current state 822. Third, the input symbol must be the next element in a prefix 824. In FIG. 8, the terms [v,n] and [v,n+1] represent whichever state element is under consideration (i.e., v, w, and f). In this case, in the current state (i.e., [v,0][w,0][f,0]), for each state element e in s, n is equal to zero. So for this first input "a" in V, it is true that "n" in [v,0] is less than the prefix length of 2 (820), further, it is true that [v,0] is in s (822), and it is true that "a" is the n+1 symbol in V (824), so a next state s'=[v,n+1] is created (i.e., [v,1]) 818 as a next state as shown in Row 1. Since "a" is not the first element in any other prefix, no other states 826 are added to Row 1.

Next, since newly created s' (i.e., Row 1 s' ([v,1])) does not yet exist as a current state s 828, it is added to the current states s, as shown in Row 3. Further, the state s' (i.e., [v,1]) is added to the work-list. The work list contains only [v,1] at this point. Finally, since there is a new state, s' (i.e., [v,1]) 834, a transition "a" is added to the table as shown in Row 1 (836), and the call to addTransition is complete 812, and the for-loop 806 continues.

The next state element e in state s 808 (i.e., Row 1) is [w,0]. Since w.seen is less than the prefix length of 2 (810), addTransition is called with the w.seen+1 symbol in W. In this case, w.seen is zero (i.e., [w,0]), so w.seen+1 is the first element in hot data stream W. So addTransition is called 812 with "b", the first prefix element in W (i.e., addTransition (b)).

The addTransition function 814 first checks 816 whether the current state s (i.e., [v,0][w,0][f,0]) has a transition for "b". Since only the "a" transition (i.e., Row 1) has been added to the current state s (i.e., [v,0][w,0][f0]), "b" is not present 816. In this case, in the current state (i.e., [v,0][w, 0][f,0]), no symbols have been seen for w (i.e., [w,0]). So for this first input "b" in W, it is true that "n" in [w,0] is less than the prefix length of 2 (820), further, it is true that [w,0] is in s (822), and it is true that "b" is the n+1 symbol in W (824), so a next state s' is created [w,1] 818 as a next state in Row 2. Since "b" is also the first element in another prefix F (826), another "seen" (i.e., [f,1]) is added to this next state s' as shown in Row 2.

Next, since newly created s' (i.e., Row 2 s' ([w,1][f,1])) does not yet exist as a current state s 828, it is added to the current states s, as shown in Row 5. Further, the state s' (i.e., [w,1][f,1]) is added to the work-list: The work list now contains states ([v,1]) and ([w,1][f,1]) at this point. Finally, since there is a new state, s' (i.e., [w,1][f,1]) 834, a transition "b" is added to the table as shown in Row 2 (836), and the call to addTransition is complete 812, and the for-loop 806 continues.

The next state element e in state s 808 (i.e., Row 1) is [f0]. Since f.seen is less than the prefix length of 2 (810), addTransition is called with the f.seen+1 symbol in F. In this case, f.seen is zero (i.e., [f,0]), so f.seen+1 is the first element in hot data stream F. So addTransition is called 812 with "b", the first prefix element in W (i.e., addTransition(b)).

The addTransition function 814 first checks 816 whether the current state s (i.e., [v,0][w,0][f,0]) has a transition for "b". Since the table now has a transition for "b" for this current state s, as shown in Row 2, this call to addtransition is complete 812. Since each state element e in s has been treated (i.e., [v,0][w,0][f,0]), this for-loop 808 is complete and control flows to the next for-loop 840.

In this for-loop 840, for the first symbol in all prefixes (i.e., a for V, b for W, and b for F), addTransition is called with that symbol as input (i.e., a, b, and b). In the first call to addTransition(a), the first statement in addTransition 816, determines that the current state s (i.e., [v,0][w,0][f0]), has a transition for "a" (i.e., Row 1), so this call to addTransition is complete. In the second and third call to addTransition(b), the first statement in addTransition 816, determines that the current state s (i.e., [v,0][w,0][f0]), has a transition for "b" (i.e., Row 2), so these two calls to addTransition are complete. No changes are made because transitions exist for "a" and "b" for this state (i.e., [v,0][w,0][f,0]). This completes this iteration of the while-loop 804.

However, since the work-list now contains states ([v,1]) and ([w,1][f,1]) at this point 804, it continues. Next, [v,1] is taken out of the work-list 806, and becomes the current state s (i.e. Row 3).

Then for each state element e in s (808), in this case there is only one (i.e., [v, 1]), and since only one symbol has been seen in V (810), the addTransition is called with the next symbol in V (i.e., "b"). Since there is no transition yet for "b" (816) for the current state s (i.e., [v,1], in Row 3), a next state s' (i.e., [v,2]) is added to the table as shown in Row 3. Of course, it is allowed to be added because all three tests are true 820, 822, 824, as previously discussed. Notice also, that since "b" is the first symbol in F (826), the element [f,1] is added to s', as shown in Row 3. Further, since "b" is the first symbol in W (826), the element [w,1] is added to s', as shown in Row 3. Since the next state s' (i.e., [v,2][f,1][w,1]), does not yet exist in s (828), it is added to s (i.e., Row 8), and is added to the work-list, which now contains ([w,1][f, 1]) and ([v,2][f,1][w,1]). Finally, since s' is not an empty (i.e., it contains [v,2][f,1][w,1]) 834, the transition is added to the table for "b" as shown in Row 3, and the call to addTransition is complete 812.

Next, in the for-loop 840, for the first symbol in all prefixes (i.e., a for V, b for W, and b for F), addTransition is called with that symbol as input (i.e., a, b, and b). In the first call to addTransition(a), the first statement in addTransition 816, determines that the current state s (i.e., [v,1]), has no transition for "a", so next all three conditions are tested 820, 822, 824, before a next state is created. However, since "a" is not the next symbol in V (824), the state element [v,2] state is not added as a next state s'. However, since "a" is the first element in one of the prefixes V (826), a next state [v,1] is added as a next state as shown in Row 4. However, since next state s' (i.e., [v,1]) exists in the current states s (828) (i.e., Row 3) nothing is added to the current states 830 or the work-list 832. However, since s' exists 834, a transition for "a" is added to the table as shown in Row 4. In the second and third call to addTransition(b), the first statement in addTransition 816, determines that the current state s (i.e., [v,1]), has a transition for "b" (i.e., Row 3), so these two calls to addTransition are complete. This completes this iteration of the while-loop 804. Tracing the algorithm becomes trivial at this point, and Table 3 is completed as shown above.

Note the correspondence between Table 3 and FIG. 9—rows 1–2 represent $S_0$, rows 3–4 represent $S_1$, rows 5–7 represent $S_2$, rows 8–10 represent $S_3$, rows 11–13 represent $S_4$, and rows 14–15 represent $S_5$.

There may be an example where two hot data streams have the same prefix (e.g., "ba" in bacedfgtrju and bamretweruyhj). In one such embodiment, when the prefix "ba" is detected, the injected prefetch code fetches both hot data streams suffixes. In such a case, the data would be available in memory regardless of which suffix the program eventually utilizes.

Prefetching can be implemented statically. However in a static environment, not all data object addresses are known (e.g., a linked list or other pointer data elements), so that information is not available for the injected prefetch instructions. Further, in the dynamic environment, profiling would determine that hot data streams have changed (e.g., when a linked list adds or deletes elements). These dynamic changes would be discoverable dynamically, and the prefetch instructions are injected dynamically. For example, a changing suffix would not be identifiable in a static solution. The negative side of the dynamic environment is the overhead incurred with dynamic analysis and code injection. However this is more than overcome, and will become even more valuable as Moore's law continues to expose the differences between processor speed and the memory bus. In modem programs, the most complicated data access patterns can be discovered with this dynamic analysis.

Figures 10, 11:
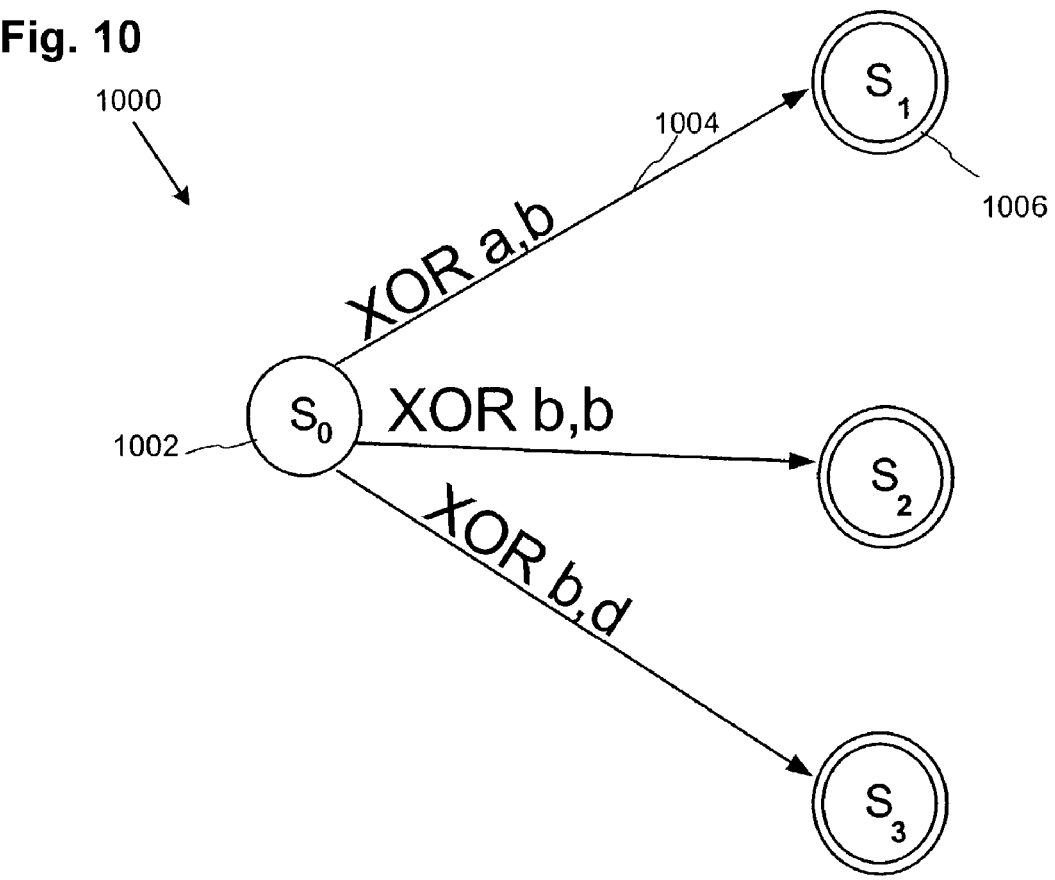
FIG. 10 is a DFSM illustrating a further simplified global DFSM.
FIG. 11 is a table illustrating prefix detection and corresponding prefetch addresses.

Another embodiment of prefetch detection would include a single state prefix detection for each hot data stream. For example, for a prefix length of two data elements (e.g., ab), an operation could be used to combine a.pc and b.pc. One such operation would be the XOR function. So to represent a state of ab, the operation would be executed on the two prefix values a.pc and b.pc (e.g., XOR a, b). As shown in FIG. 10, a state diagram representing accepting states is shown. In this example, an accepting state 1006 is entered from the start state 1002, when an operation performed on two pcs 1004, match a required value. Of course, the operation would not be limited to the XOR function.

As shown in FIG. 11, one implementation of the state machine described in FIG. 10 includes a table 1100 with combinations of valid operation results 1102, and their corresponding prefetch addresses 1104. The corresponding prefetch addresses 1104 are prefetched whenever an XOR'd value matches the table key 1102. Thus the table key column is the XOR'd addresses of the pcs of the prefix, and the corresponding value for that key is the addresses to prefetch when there is a key match. Of course, there would be aliasing problems since multiple pcs could XOR to the same key value (e.g., XOR a, b=XOR b, a).

However, by reducing each prefix acceptance to a single state 1000, prefix injection checks will only need to be injected at the second pc value. For example, in order to implement a table key value check for the key values shown in the table 1100, prefix detection checks would need to be inserted at c.pc, b.pc, and d.pc. At each of these second prefix address values, the injected code would perform an XOR operation on the second pc address value with the "last.pc" data object address access value, as follows:

c.pc: If ((XOR last.pc, c.pc) anyTableKeyValue) then
  prefetch addresses at TableKeyMatch(XOR
  last.pc, c.pc)

The described techniques differ from prior software prefetching techniques in at least three potential ways. First, in one embodiment, hot data streams are profile-based and do not rely on static analysis. Second, in such a profile-based embodiment, the hot data stream elements can be for any arbitrary data object accesses. Finally, profiling and/or prefetch code injection is a dynamic technique that is capable of adaptation as the program executes. Additionally, it is a software technique that can be easily configured and tuned for a particular program, and performs more global data object access pattern analysis.

Figure 12:
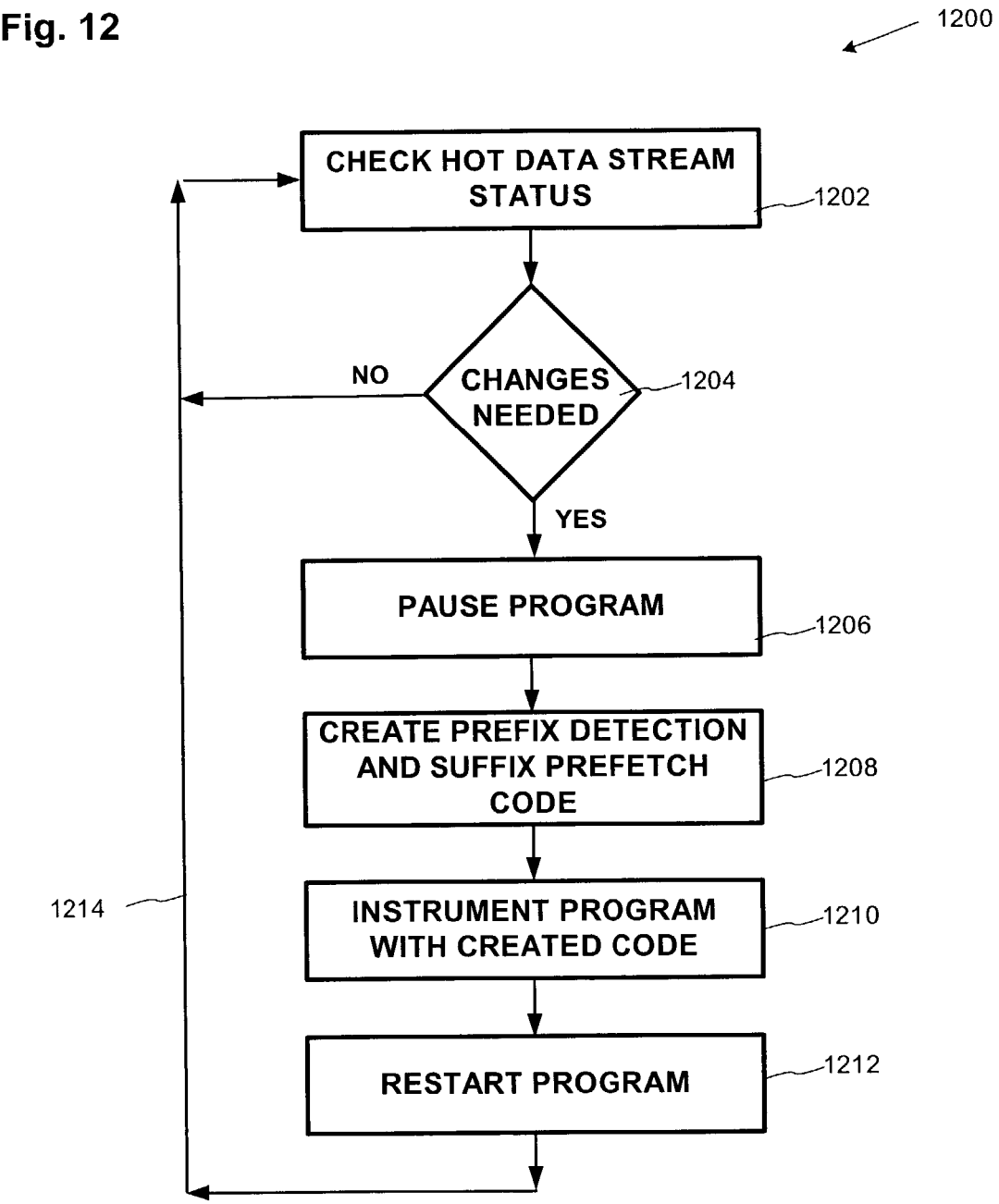
FIG. 12 is a flow chart of a method for performing dynamic prefetch.

FIG. 12 is a flow chart for a dynamic prefetch method or system. The dynamic prefetch program periodically checks 1202 to see if there are any new or additional hot data streams for optimization. A buffer or other memory location is checked to see if there are any new hot data streams or changed hot data streams that should be implemented. If so 1204, the method pauses an executing computer program 1206 in order to instrument the program (e.g., instrumentation as shown FIGS. 5, 6, and/or 7). Next, code is created for detecting a prefix and prefetching corresponding code 1208. Such code can be as simple as code for performing an operation on the last two data fetches (e.g., XOR last.pc, b.pc) and prefetching addresses in a table upon a key match, or more complex, such as creating a global DFSM and translating it into code for detecting a prefix and prefetching a corresponding suffix (e.g., FIG. 5 or 6). Next, the program is instrumented with the created code 1210 (e.g., FIG. 5, 6, or 7). Finally, the program is restarted and executes with the optimized code 1212. The method can be performed periodically 1214 which would allow any changes in the hot data streams to be updated in an ongoing manner.

Figure 13:
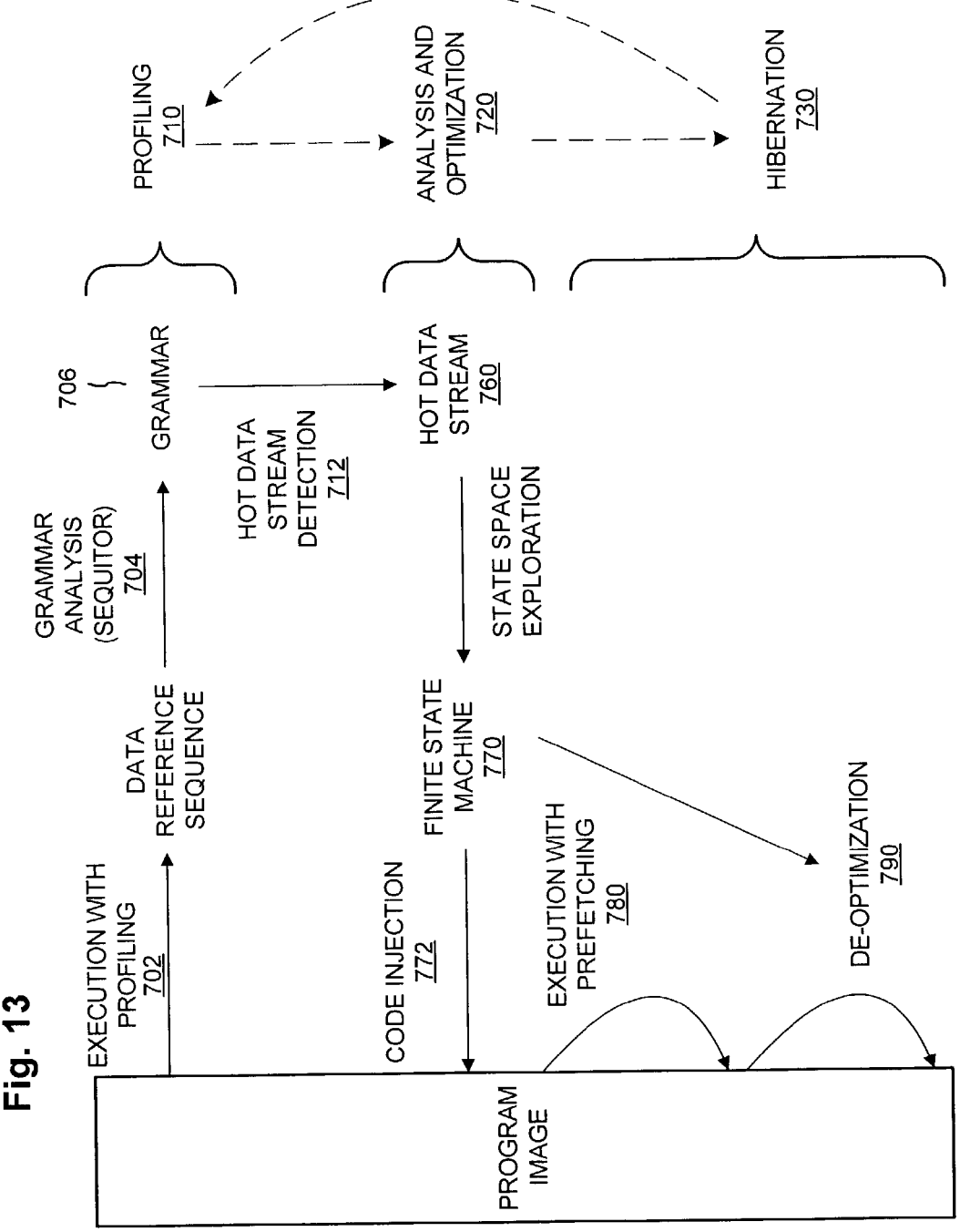
FIG. 13 is a temporal diagram of a recursive profiling, optimization, and injection of a dynamic profiler and prefetch implementation.

FIG. 13 is an overview of one context where a dynamic prefetch method and system is used be used in relations to an overall dynamic method and system of optimization. A temporal profiling produces a sequence of data references that are analyzed in a grammar to detect hot data streams 710 as discussed in DYNAMIC TEMPORAL OPTIMIZATION FRAMEWORK, which was incorporated herein by reference. A low-overhead, long burst dynamic temporal profiling framework is a first phase in an overall dynamic optimization process based on hot data stream pre-fetching. The dynamic optimization process operates in three phases—profiling 710, analysis and optimization 720, and hibernation 730. First, the profiling phase 710 collects a temporal data reference profile from a running program with low-overhead 702. A grammar analysis 704 using the Sequitur compression process incrementally builds an online grammar representation 706 of the traced data references.

Once sufficient data references have been traced, profiling is turned off, and the analysis and optimization phase 720 commences. First, a fast hot data stream detection 712 extracts hot data streams from the Sequitur grammar representation 706 and delivers hot data streams 760 to the analysis and optimization phase 720. Then, a prefetching engine builds a stream prefix matching deterministic finite state machine (DFSM) 770 for these hot data streams, and dynamically injects checks 772 at appropriate program points to detect and prefetch these hot data streams in the program image.

Finally, the process enters the hibernation phase 730 where no profiling or analysis is performed, and the program continues to execute (780) as optimized with the added prefetch instructions. At the end of the hibernation phase, the program image is de-optimized 790 to remove the inserted checks and prefetch instructions, and control returns to the profiling phase 710. For long-running programs, this profiling 710, analysis and optimization 720 and hibernate 730 cycle may repeat multiple times.

Figure 14:
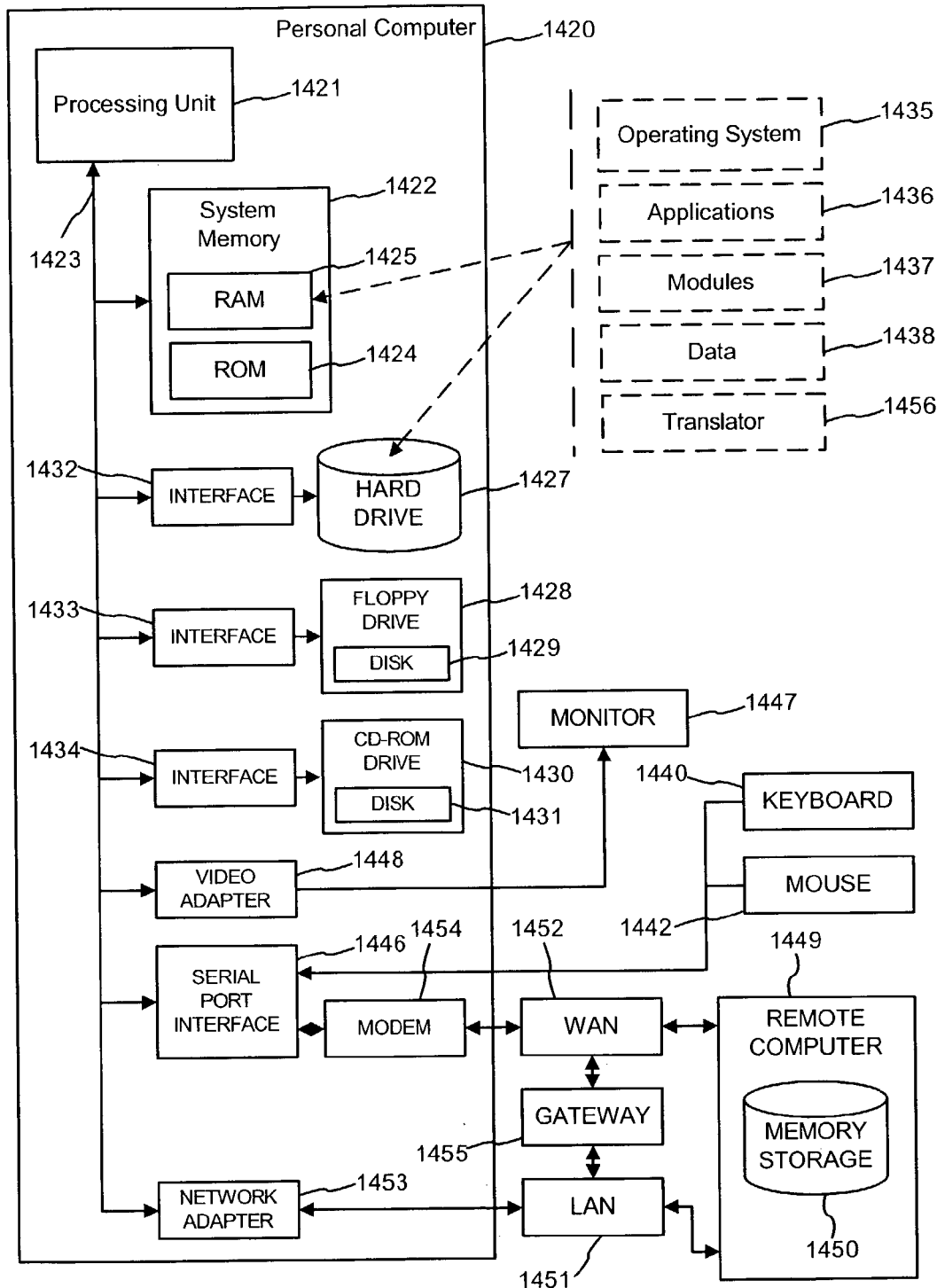
FIG. 14 is a block diagram of a computer system that may be used to implement a method, apparatus, and system embodying dynamic prefetching.

FIG. 14 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 14, an exemplary system for implementation includes a conventional computer 1420 (such as personal computers, laptops, servers, mainframes, and other variety computers) includes a processing unit 1421, a system memory 1422, and a system bus 1423 that couples various system components including the system memory to the processing unit 1421. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 1421.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 1424 and random access memory (RAM) 1425. A basic input/output system (BIOS), containing the basic routines that help to transfer information between elements within the computer 1420, such as during start-up, is stored in ROM 1424.

The computer 1420 further includes a hard disk drive 1427, a magnetic disk drive 1428, e.g., to read from or write to a removable disk 1429, and an optical disk drive 1430, e.g., for reading a CD-ROM disk 1431 or to read from or write to other optical media. The hard disk drive 1427, magnetic disk drive 1428, and optical disk drive 1430 are connected to the system bus 1423 by a hard disk drive interface 1432, a magnetic disk drive interface 1433, and an optical drive interface 1434, respectively. The drives and their associated computer-readable media provide nonvolatile storage of data, data structures, computer-executable instructions, etc. for the computer 1420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 1425, including an operating system 1435, one or more application programs 1436, other program modules 1437, and program data 1438; in addition to an implementation 1456.

A user may enter commands and information into the computer 1420 through a keyboard 1440 and pointing device, such as a mouse 1442. These and other input devices are often connected to the processing unit 1421 through a serial port interface 1446 that is coupled to the system bus, but may be connected by other interfaces, such as a parallel port, game port or a universal serial bus (USB). A monitor 1447 or other type of display device is also connected to the system bus 1423 via an interface, such as a video adapter 1448. In addition to the monitor, computers typically include other peripheral output devices (not shown), such as speakers and printers.

The computer 1420 operates in a networked environment using logical connections to one or more remote computers, such as a remote computer 1449. The remote computer 1449 may be a server, a router, a peer device or other common network node, and typically includes many or all of the elements described relative to the computer 1420, although only a memory storage device 1450 has been illustrated. The logical connections depicted include a local area network (LAN) 1451 and a wide area network (WAN) 1452. Such networking environments are commonplace in offices, enterprise-wide computer networks, intranets and the Internet.

When used in a LAN networking environment, the computer 1420 is connected to the local network 1451 through a network interface or adapter 1453. When used in a WAN networking environment, the computer 1420 typically includes a modem 1454 or other means for establishing communications (e.g., via the LAN 1451 and a gateway or proxy server 1455) over the wide area network 1452, such as the Internet. The modem 1454, which may be internal or external, is connected to the system bus 1423 via the serial port interface 1446. In a networked environment, program modules depicted relative to the computer 1420, or portions thereof, may be stored in the remote memory storage device. It will be appreciated that the network connections shown are exemplary and other means of establishing a communications link between the computers may be used.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer implemented method of dynamically instrumenting a computer program to detect that plural data fetches comprise a prefix of data fetches in a given stream of data fetches, and to prefetch a suffix of data fetches in the stream, the method comprising:
    creating instructions that detect when the prefix of elements in the stream have been fetched by the computer program;
    creating instructions that prefetch elements in a suffix of the stream when the prefix is detected; and
    instrumenting the computer program with the created instruction;
    wherein a prefix is detected when a created instruction determines that an operation performed on two or more consecutive prefix element values is equivalent to a key value in a table.

2. The method of claim 1 further comprising:
    pausing a thread of the computer program while instrumenting a procedure of the computer program;
    resuming execution of the thread after completing the instrumentation.

3. The method of claim 1, wherein the created instructions that detect the prefix of instructions in the stream, are created from a deterministic finite state machine that describes states for plural streams of data fetches.

4. The method of claim 3, wherein a state in the state machine comprises a stream identifier and a number of elements seen in the identified stream.

5. The method of claim 3, wherein each of the plural streams comprises an accepting state for that stream.

6. A computer system for reducing data fetch latency by dynamically determining in advance, data object fetch requests that will be executed by a computer program before the fetch requests are made, the system comprising:
    a central processing unit, a main memory and a secondary memory, transferring data and instructions via a bus;
    a computer program executing in the system comprising fetching data elements in sequences;
    an optimization program that is provided with plural sequences of data elements fetched by the computer program, and that pauses the executing computer program in order to inject instructions into the computer program that optimize the computer program's performance as follows:
        determine when a prefix of data elements in a sequence have been fetched by the computer program; and
        prefetch a suffix of the data elements in the sequence upon making the determination;
    wherein the prefix of data elements is determined to be fetched when an injected instruction determines that an operation performed on two or more consecutive prefix element values is equivalent to a key value in a table.

7. The system of claim 6 wherein the same prefix identifies two different suffixes, and both suffixes are prefetched upon making the determination.

8. The system of claim 6 wherein prefix determination is a series of state transitions to an accepting state, one such transition for each data element in the prefix.

9. The system of claim 6 wherein each data element comprises an address of the program counter where the data fetch instruction is located, and an address where the data object is fetched.

10. The system of claim 6 wherein the prefix length is two data elements and the balance of the data elements in the sequence is at least 8 elements.

11. A computer readable medium comprising a method for performing an optimization on an executing computer program, the method comprising:
  pausing the executing computer program;
  constructing computer executable instructions that determine when a prefix of data fetches in a stream of data accesses have been fetched by the computer program;
  constructing computer executable instructions that prefetch a suffix of the stream;
  injecting instructions into the computer program that direct execution to procedures containing the constructed executable instructions; and
  resuming execution of the computer program;
  wherein the prefix determination is made when an injected instruction determines that an operation performed on plural consecutive prefix element values corresponds with a key value in a table.

12. The computer readable medium of claim 11 wherein the instructions that determine prefix fetches comprise a series of state transitions to an accepting state, one such transition for each data fetch seen in the prefix.

13. The computer readable medium of claim 12 wherein each data fetch comprises an address of the program counter where the data fetch instruction is located, and an address where the data object is fetched.

14. The computer readable medium of claim 11 wherein the operation is an exclusive-or operation.

15. A computer implemented method of dynamically instrumenting a computer program to detect that plural data fetches comprise a prefix of data fetches in a given stream of data fetches, and to prefetch a suffix of data fetches in the stream, the method comprising:
  creating instructions that detect when the prefix of elements in the stream have been fetched by the computer program:
  creating instructions that prefetch elements in a suffix of the stream when the prefix is detected; and
  instrumenting the computer program with the created instructions;
  wherein instructions that detect when the prefix is fetched comprise a series of state transitions to an accepting state, one such transition for each data fetch seen in the prefix, and wherein elements in the prefix of elements comprise an address of a program counter and an address where a data object is fetched.

16. The method of claim 15 wherein a prefix is detected when a created instruction determines that an operation performed on elements in a stream corresponds with a key value in a table.

17. A computer system for reducing data fetch latency by dynamically determining in advance, data object fetch requests that will be executed by a computer program before the fetch requests are made, the system comprising:
  a central processing unit, a main memory and a secondary memory, transferring data and instructions via a bus:
  a computer program executing in the system comprising fetching data elements in sequences;
  an optimization program that is provided with plural sequences of data elements fetched by the computer program, and that pauses the executing computer program in order to inject instructions into the computer program that optimize the computer program's performance as follows:
    determine when a prefix of data elements in a sequence have been fetched by the computer program; and
    prefetch a suffix of the data elements in the sequence upon making the determination;
  wherein instructions that determine when the prefix of data elements have been fetched comprise a series of state transitions to an accepting state, one such transition for each data fetch seen in the prefix, and wherein data elements in the prefix of data elements comprise an address of a program counter and an address of a data object.

18. The system of claim 17 wherein a prefix is determined when a created instruction determines that an operation performed on elements in a sequence corresponds with a key value in a table.

19. A computer readable medium comprising a method for performing an optimization on an executing computer program, the method comprising:
  pausing the executing computer program;
  constructing computer executable instructions that determine when a prefix of data fetches in a stream of data accesses have been fetched by the computer program;
  constructing computer executable instructions that prefetch a suffix of the stream;
  injecting instructions into the computer program that direct execution to procedures containing the constructed executable instructions; and
  resuming execution of the computer program;
  wherein instructions that determine when the prefix of data fetches have been fetched comprise a series of state transitions to an accepting state, one such transition for each data fetch seen in the prefix, and wherein fetches in the prefix of data fetches comprise an address of a program counter and an address of a data object.

20. The computer readable medium of claim 19 wherein a prefix of data fetches in a stream of data accesses are determined to have been fetched when a constructed executable instruction determines that an operation performed on elements in a stream corresponds with a key value in a table.

* * * * *

UNITED STATES PATENT AND TRADEMARK OFFICE
CERTIFICATE OF CORRECTION

PATENT NO. : 7,058,936 B2
APPLICATION NO. : 10/304306
DATED : June 6, 2006
INVENTOR(S) : Trishul Chilimbi et al.

It is certified that error appears in the above-identified patent and that said Letters Patent is hereby corrected as shown below:

Title Page 3, in field (56), under "Other Publications", in column 1, line 55, delete "Data-member" and insert -- Data-Member --, therefor.

Title Page 3, in field (56), under "Other Publications", in column 2, line 26, delete "Priniciples" and insert -- Principles --, therefor.

Title Page 3, in field (56), under "Other Publications", in column 2, line 35, delete "multighreaded" and insert -- multithreaded --, therefor.

On Sheet 7 of 12, in "Fig. 8", line 25, below "addTransition(a) ;" insert -- } --.

In column 6, line 6, delete "state= =s" and insert -- state==s --, therefor.

In column 7, line 33, delete "v.head=$v_1$ $_{v2}$" and insert -- v.head=$v_1$, $v_2$ --, therefor.

In column 7, line 58, delete "a.pe" and insert -- a.pc --, therefor.

In column 7, line 63, delete "<a.pc,a.addr>" and insert -- <a.pc, a.addr> --, therefor.

In column 11, line 57, delete ""s"'" and insert -- "s'" --, therefor.

In column 12, line 1–2, delete "V.hotDataStream v.seen+1" and insert -- v.hotDataStream $_{v.seen+1}$ --, therefor.

In column 12, line 12, delete "[f0]" and insert -- [f,0] --, therefor.

In column 12, line 49, delete "[f0]" and insert -- [f,0] --, therefor.

In column 13, line 1, delete "[f0]" and insert -- [f,0] --, therefor.

In column 13, line 10, delete "addtransition" and insert -- addTransition --, therefor.

Signed and Sealed this

Twenty-second Day of June, 2010

David J. Kappos
*Director of the United States Patent and Trademark Office*

CERTIFICATE OF CORRECTION (continued)
U.S. Pat. No. 7,058,936 B2

In column 13, line 18, delete "[f0]" and insert -- [f,0] --, therefor.

In column 13, line 22, delete "[f0]" and insert -- [f,0] --, therefor.

In column 14, line 65, after "c.pc)" insert -- == --.

In column 19, line 36, in Claim 15, after "program" delete ":" and insert -- ; --, therefor.

In column 20, line 4, in Claim 17, after "bus" delete ":" and insert -- ; --, therefor.